United States Patent
Nakamura et al.

(10) Patent No.: US 9,963,144 B2
(45) Date of Patent: May 8, 2018

(54) TRAVEL CONTROL DEVICE AND TRAVEL CONTROL METHOD

(71) Applicant: Nissan Motor Co., Ltd., Yokohama-shi, Kanagawa (JP)

(72) Inventors: Masahide Nakamura, Kanagawa (JP); Tsuneyuki Watanabe, Kanagawa (JP); Teruhisa Takano, Kanagawa (JP); Takahiro Yano, Kanagawa (JP); Yukinori Nishida, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/506,978

(22) PCT Filed: Aug. 29, 2014

(86) PCT No.: PCT/JP2014/072672
§ 371 (c)(1),
(2) Date: Feb. 27, 2017

(87) PCT Pub. No.: WO2016/031036
PCT Pub. Date: Mar. 3, 2016

(65) Prior Publication Data
US 2017/0274898 A1 Sep. 28, 2017

(51) Int. Cl.
*B60W 30/045* (2012.01)
*B60W 30/12* (2006.01)
(Continued)

(52) U.S. Cl.
CPC .......... *B60W 30/045* (2013.01); *B60W 30/09* (2013.01); *B60W 30/12* (2013.01); *G08G 1/167* (2013.01); *B60W 2550/14* (2013.01)

(58) Field of Classification Search
CPC .... B60W 30/045; B60W 30/09; B60W 30/12; B60W 2550/14; G08G 1/167
See application file for complete search history.

(56) References Cited

U.S. PATENT DOCUMENTS 5,172,317 A  12/1992 Asanuma et al.
6,185,492 B1  2/2001 Kagawa et al.
(Continued)

FOREIGN PATENT DOCUMENTS

JP  H0248705 A  2/1990
JP  H1191606 A  4/1999
(Continued)

*Primary Examiner* — Dale W Hilgendorf
(74) *Attorney, Agent, or Firm* — Young Basile Hanlon & MacFarlane, P.C.

(57) ABSTRACT

A travel control device acquires subject vehicle information including the position of a subject vehicle, acquires lane marker information including positions of lane markers, sets control areas with reference to the lane markers, and controls a travel position of the subject vehicle so that the subject vehicle travels between a pair of control areas set at right and left of the subject vehicle. The lane markers include a change-point lane marker and includes a course change point. When the pair of control areas set with reference to the change-point lane marker comprises one of the pair at a course change side of the subject vehicle and the other of the pair, the ratio of a width of the other to a width of the one is set larger than the ratio of the widths of control areas set with reference to a lane marker other than the change-point lane marker.

16 Claims, 12 Drawing Sheets

(51) Int. Cl.
*B60W 30/09* (2012.01)
*G08G 1/16* (2006.01)

(56) References Cited

U.S. PATENT DOCUMENTS

| | | | | |
|---|---|---|---|---|
| 7,620,497 | B2* | 11/2009 | Maass | G08G 1/167 |
| | | | | 701/41 |
| 7,765,066 | B2* | 7/2010 | Braeuchle et al. | B60W 30/12 |
| | | | | 701/41 |
| 8,346,436 | B2* | 1/2013 | Yokoyama et al. | G08G 1/167 |
| | | | | 701/41 |
| 8,521,363 | B2* | 8/2013 | Kataoka | B60W 30/12 |
| | | | | 701/41 |
| 2011/0187515 | A1 | 8/2011 | Saito et al. | |
| 2017/0066445 | A1* | 3/2017 | Habu | B60W 2550/14 |
| 2017/0240171 | A1* | 8/2017 | Chia et al. | B60W 30/12 |

FOREIGN PATENT DOCUMENTS

| JP | 2010188976 A | 9/2010 |
|---|---|---|
| JP | 5070171 B2 | 11/2012 |

\* cited by examiner

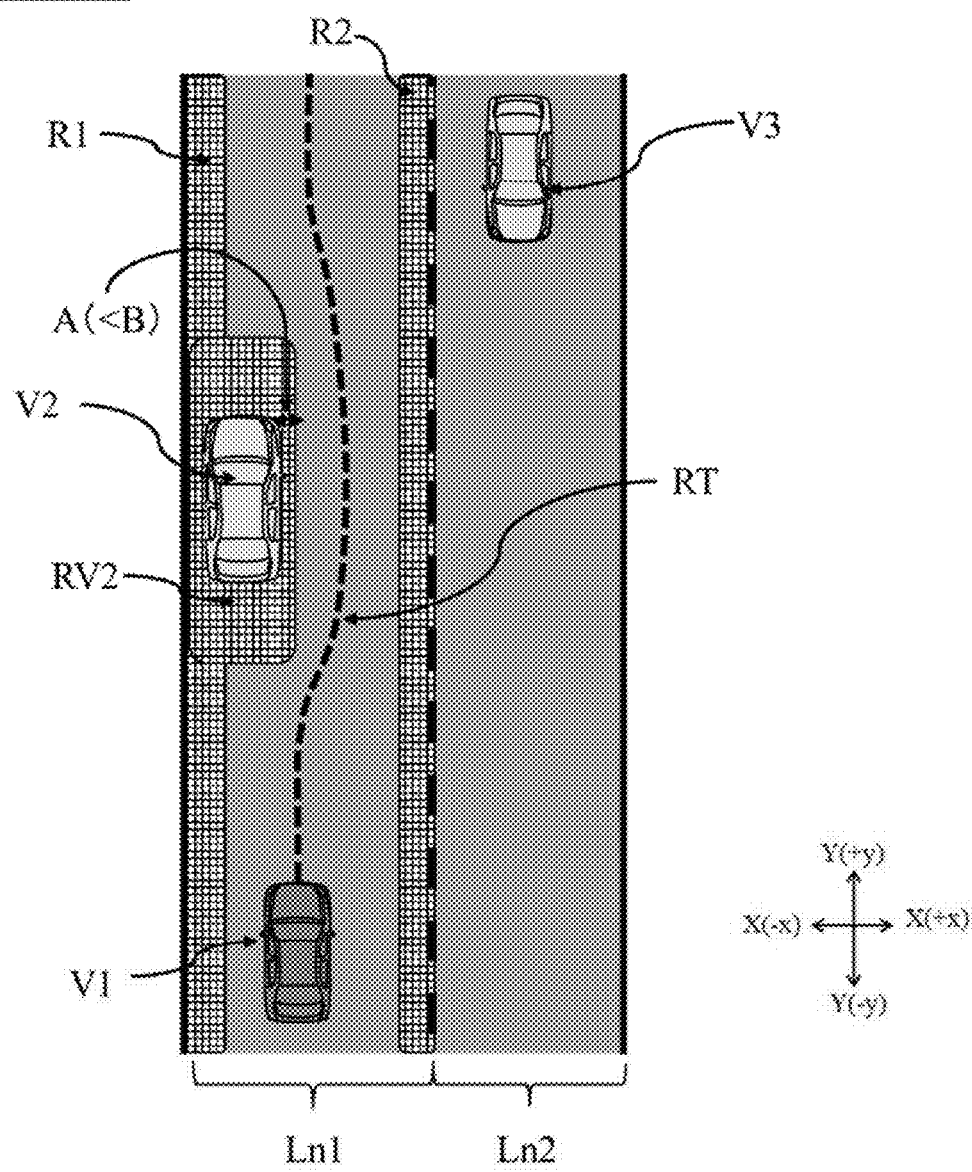

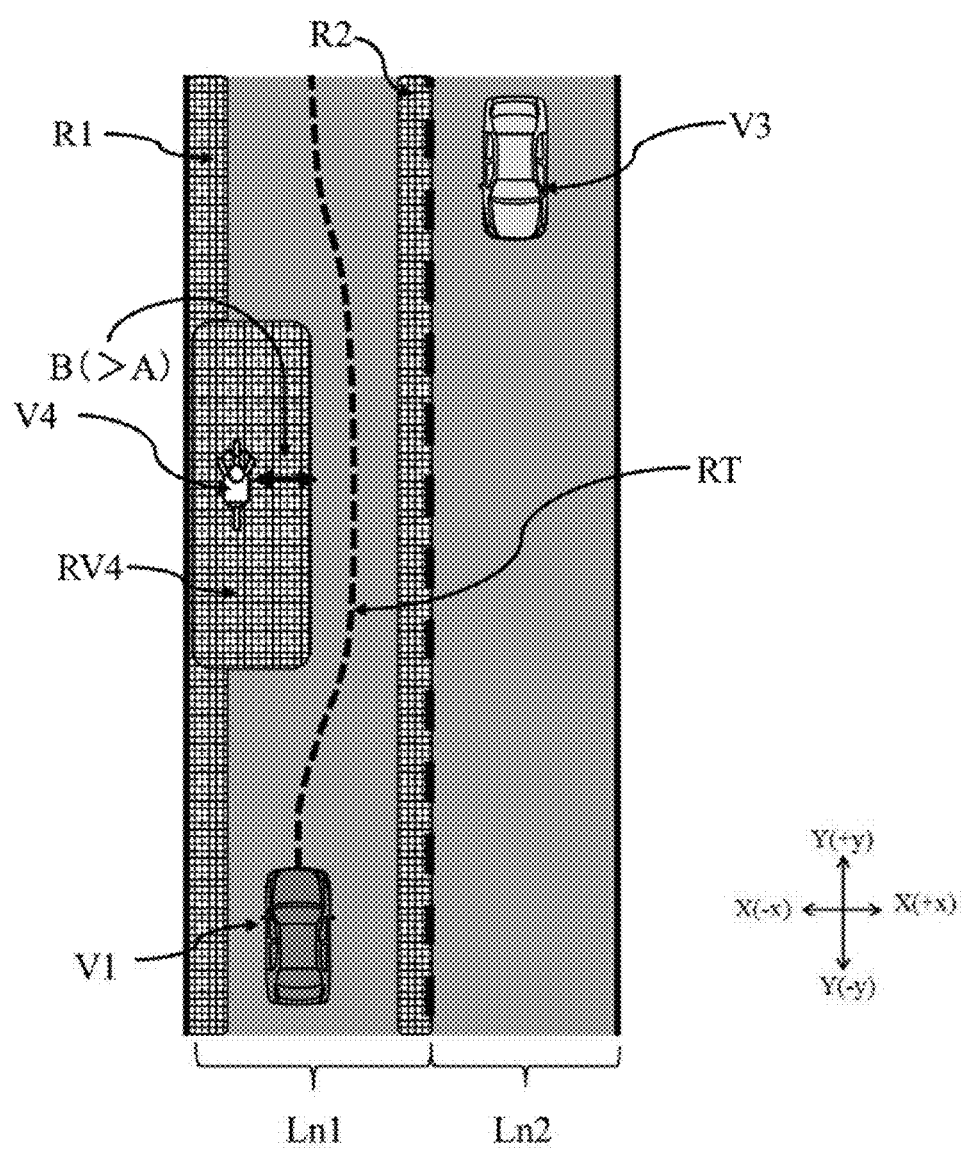

TRAVEL CONTROL DEVICE AND TRAVEL CONTROL METHOD

TECHNICAL FIELD

The present invention relates to a travel control device and travel control method that control travel of a vehicle.

BACKGROUND

With regard to this kind of device, a conventional technique is known which includes obtaining a first control threshold based on a first degree of risk at the left side of a vehicle and a second control threshold based on a second degree of risk at the right side of the vehicle (See JP5070171B). The first control threshold and the second control threshold each represent a distance from a road end. The first control threshold is changed toward a first object at the left side of the vehicle as the second degree of risk increases while the second control threshold is changed toward a second object at the right side of the vehicle as the first degree of risk increases.

In the above conventional technique, however, when no object exists at the right and left of a subject vehicle, the subject vehicle is controlled to travel constantly at the center of a travel lane. Therefore, when the subject vehicle changes its course at a branch, such as an intersection, the subject vehicle is to travel at the center of a travel lane until just before changing the course and suddenly changes the course at the branch. Such a sudden course change diverges from the passengers' expectation of following the course change motion and gives an uncomfortable feeling to the passengers, which may be problematic.

SUMMARY

A problem to be solved by the present invention is to provide a travel control device and a travel control method that are able to deviate the travel position of a subject vehicle in the travel lane toward the course change side of the subject vehicle when the subject vehicle changes its course at a branch of a road.

The present invention solves the above problem as follows. The travel position of a subject vehicle is controlled in accordance with control areas. The control areas are set with reference to a lane marker crossing a width direction line that includes a course change point and extends by a predetermined distance/length. The subject vehicle starts course change at the course change point, which is located ahead the subject vehicle in the travel direction. The control areas comprise one at the course change side and the other. With regard to widths of the control areas, the ratio (WR/WT) of a width WR of the other to a width WT of the one is set larger than that until then.

According to the present invention, when the travel position of the subject vehicle is controlled in accordance with the control areas which are set with reference to the lane marker, the widths of the control areas are set to have the above relationship. Again, the lane marker crossing a width direction line includes a course change point and extends by a predetermined distance and the subject vehicle starts course change at the course change point, which is located ahead the subject vehicle in the travel direction. Therefore, when the subject vehicle is operated to change its course at the course change point, the travel position of the subject vehicle deviates toward the course change side. This operation matches the drive feeling of passengers of the subject vehicle and can mitigate the uncomfortable feeling given to the passengers.

DETAILED DESCRIPTION OF THE DRAWINGS

FIG. 2B is a plan view for describing an example of a process to operate the subject vehicle to avoid an avoidance object;

FIG. 2C is a plan view for describing another example of a process to operate the subject vehicle to avoid an avoidance object;

DETAILED DESCRIPTION OF THE EMBODIMENTS

Hereinafter, one or more embodiments of the present invention will be described with reference to the drawings. In the embodiments, the present invention will be described by exemplifying examples in which the travel control device for a vehicle according to the present invention is applied to a travel control system equipped in a vehicle. Embodiments of the travel control device according to the present invention are not limited and can also be applied to a portable terminal device that can exchange information with the side of a vehicle. The travel control device, travel control system and portable terminal device are each a computer that executes a calculation process.

Figure 1:
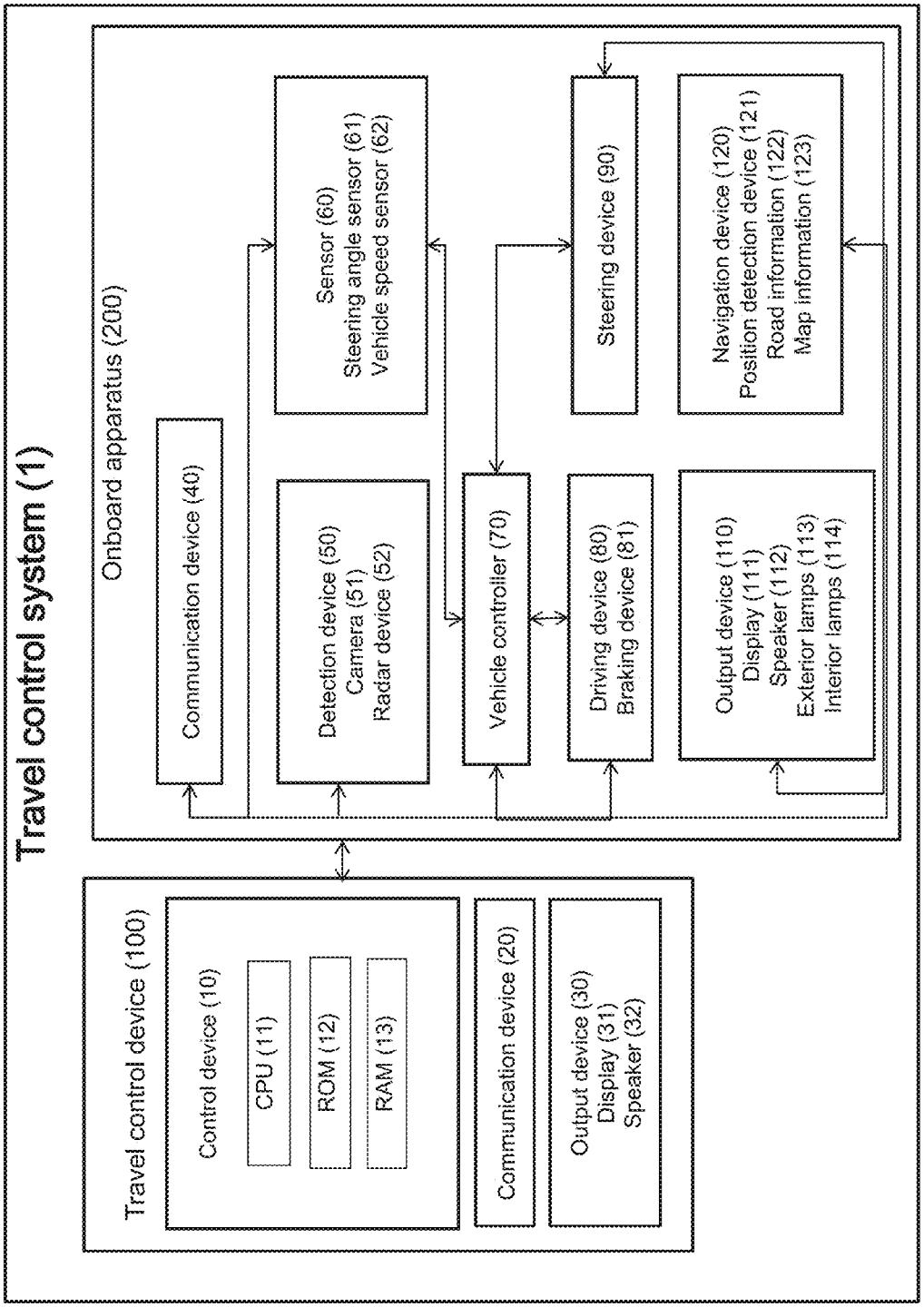
FIG. 1 is a block diagram of a travel control system according to one or more embodiments of the present invention.

FIG. 1 is a diagram illustrating a block configuration of a travel control system 1 according to one or more embodiments of the present invention. The travel control system 1 is equipped in a vehicle and comprises a travel control device 100 and an onboard apparatus 200.

The travel control device 100 according to one or more embodiments of the present invention has a lane departure prevention function (lane keep support function) to recognize a lane in which the subject vehicle is traveling and control the moving behavior of the subject vehicle so as to maintain a certain relationship between the position of a lane marker of the lane and the position of the subject vehicle. The travel control device 100 according to one or more embodiments of the present invention controls the moving behavior of the subject vehicle so that the subject vehicle travels along the center of a lane. The travel control device 100 may control the moving behavior of the subject vehicle so that the distance from the lane marker of a lane to the subject vehicle along the road width direction falls within a predetermined range.

The travel control device 100 and the onboard apparatus 200 have communication devices 20 and 40, respectively, and exchange information with each other via wired or wireless communication.

The onboard apparatus 200 will first be described.

The onboard apparatus 200 according to one or more embodiments of the present invention comprises a detection device 50, sensor 60, vehicle controller 70, driving device 80, steering device 90, output device 110, and navigation device 120. These devices which constitute the onboard apparatus 200 are connected to one another via a CAN (Controller Area Network) or other in-vehicle LAN to mutually exchange information.

These devices which constitute the onboard apparatus 200 will each be described below.

The detection device 50 detects the existence of one or more lane markers and their existence positions and also detects the existence of one or more avoidance objects which the subject vehicle should avoid and their existence positions. The detection device 50 according to one or more embodiments of the present invention includes, but is not limited to including, a camera 51. The camera 51 according to one or more embodiments of the present invention is, for example, a camera that comprises an imaging element such as CCD. The camera 51 according to one or more embodiments of the present invention, which is installed in the subject vehicle, captures images around the subject vehicle and acquires data of images that include lane markers and avoidance objects existing around the subject vehicle. Specific examples and the like of the "lane markers" and "avoidance objects" described in one or more embodiments of the present invention will be described later.

The detection device 50 extracts the positions of lane markers around the subject vehicle and the positions of avoidance objects that exist around the subject vehicle, such as by data analysis on images captured by the camera 51. The positions of avoidance objects include positions relative to lane markers that define a lane.

In addition, the detection device 50 calculates the distance from the subject vehicle to an avoidance object on the basis of the position of the avoidance object relative to the subject vehicle. Further, the detection device 50 may also calculate a relative speed and relative acceleration between the subject vehicle and the avoidance object from a variation over time of the position of the avoidance object. As for a process to calculate the positional relationship between the subject vehicle and another vehicle based on the image data and a process to calculate the speed information based on the amount of variation over time of the positional relationship, schemes known at the time of filing of the present application can be appropriately used.

In addition or alternatively, the detection device 50 may analyze the image data and identify the classification of the avoidance object on the basis of the analysis result. The detection device 50 can use a pattern matching technique or the like to identify whether the avoidance object included in the image data is a vehicle, pedestrian, or traffic sign.

The detection device 50 according to one or more embodiments of the present invention may use a radar device 52 as substitute for the above-described camera 51 or together with the camera 51 to detect the position and the like of the avoidance object. Examples of the radar device 52 may be those, such as millimeter-wave radar, laser radar and ultrasonic radar, which are known at the time of filing of the present application.

In one or more embodiments of the present invention, information including the positions of lane markers detected by the detection device 50 and information including the positions of avoidance objects are sent to the side of the travel control device 100. The information transmitted from the detection device 50 to the travel control device 100 includes, in addition to the information on the positions of lane markers and avoidance objects, speed information and acceleration information of the avoidance objects, information on the classification of the avoidance objects, and information on the vehicle type and the like when the avoidance objects are vehicles.

The "lane marker" in one or more embodiments of the present invention is not limited, provided that it has a function to define a lane. The lane marker may be a line drawn on a road surface, a planting that exists between lanes, or a road structure that exists at the side of a road shoulder of a lane, such as a guardrail, curbstone, sidewalk, and exclusive road for two wheels. The lane marker may also be a fixed structure that exists at the side of a road shoulder of a lane, such as an advertising display, traffic sign, store, and roadside tree.

The "avoidance object" in one or more embodiments of the present invention refers to an object which the subject vehicle should avoid to travel (so that the subject vehicle does not excessively come close to the object). Avoidance objects in one or more embodiments of the present invention include a stationary object and moving object. Examples of the stationary object include other vehicles that are parked or stopped; road equipment, such as road signs and power or telephone poles; temporary objects on a road, such as falling objects and removed snow, and pedestrians standing; which may be obstacles for a vehicle traveling. Examples of the moving object include other vehicles traveling and pedestrians walking. Examples of such other vehicles include two-wheel vehicles, such as bicycles and motorbikes; large-sized vehicles, such as buses and trucks; special-purpose vehicles, such as trailers and crane cars; emergency vehicles, such as ambulance cars, fire truck and police cars; and standard-sized cars. Examples of avoidance objects further include those in which objects may not necessarily exist but which the subject vehicle should avoid, such as construction sites, damaged areas of roads and waterholes. When a subject vehicle V1 is traveling, avoidance objects of vehicles include preceding vehicles, following vehicles, and oncoming vehicles.

The sensor 60 according to one or more embodiments of the present invention comprises a steering angle sensor 61 and vehicle speed sensor 62. The steering angle sensor 61 detects steering information regarding the steering, such as a steering amount, steering speed and steering acceleration of the subject vehicle, and sends the steering information to the vehicle controller 70 and the travel control device 100. The vehicle speed sensor 62 detects a speed and acceleration of the subject vehicle and sends them to the vehicle controller 70 and the travel control device 100.

The vehicle controller 70 according to one or more embodiments of the present invention is an in-vehicle computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and internal combustion engine as the traveling drive sources. Examples of the electric car and hybrid car having an electric motor as the traveling drive source include a type in which the power source for the motor is a secondary battery and a type in which the power source for the motor is a fuel cell.

The driving device 80 according to one or more embodiments of the present invention comprises a drive mechanism of the subject vehicle V1. The drive mechanism includes an electric motor and/or internal-combustion engine as the above-described traveling drive source, a power transmission device including a drive shaft and automatic transmission that transmit the output of the traveling drive source to the drive wheels, and a braking device 81 that brakes wheels. The driving device 80 generates respective control signals for these components of the drive mechanism and executes the travel control including acceleration and deceleration of the vehicle. These control signals for the drive mechanism are generated on the basis of input signals by an accelerator operation and brake operation of the driver and control signals acquired from the vehicle controller 70 or from the travel control device 100. Command information may be sent to the driving device 80, which can thereby automatically perform the travel control including acceleration and deceleration of the vehicle. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention has a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 sends command information, including a steering amount, to the steering device 90 thereby to execute the steering control. In addition or alternatively, the travel control device 100 may control a braking quantity for each wheel of the vehicle thereby to execute the steering control. In this case, the vehicle controller 70 sends command information, including the braking quantity for each wheel, to the braking device 81 thereby to execute the steering control for the vehicle.

The navigation device 120 according to one or more embodiments of the present invention calculates a route from the current position of the subject vehicle to a destination and outputs route guidance information via the output device 110 which will be described later. The navigation device 120 has a position detection device 121, road information 122 including a road type, road width, road shape and others, and map information 123 in which the road information 122 is associated with each point. The position detection device 121 according to one or more embodiments of the present invention is responsible to the Global Positioning System (GPS) and detects a position (latitude and longitude) at which the vehicle is traveling. The navigation device 120 specifies a road link on which the subject vehicle travels, on the basis of the current position of the subject vehicle detected by the position detection device 121. The road information 122 according to one or more embodiments of the present invention is stored such that identification information for each road link is associated with the road type, road width, road shape, whether or not the overtaking is permitted (whether or not the lane change to an adjacent lane is permitted), and other road-related information. The navigation device 120 refers to the road information 122 to acquire the information regarding a road to which the road link on which the subject vehicle travels belongs, and sends the information to the travel control device 100. The road type, road width and road shape of a road on which the subject vehicle travels are used in a travel control process to calculate a target route on which the subject vehicle is to travel.

The output device 110 according to one or more embodiments of the present invention outputs various information items regarding the travel assistance to the user or to passengers of surrounding vehicles. In one or more embodiments of the present invention, the output device 110 outputs one or more information items among information in accordance with the positions of lane markers, information in accordance with the positions of avoidance objects, and information regarding travel control for the subject vehicle by the travel control device 100.

The output device 110 according to one or more embodiments of the present invention includes a display 111, speaker 112, exterior lamps 113, and interior lamps 114. The exterior lamps 113 include headlights, winker lamps, and brake lamps. The interior lamps 114 include lighting displays of indicators and lighting displays of the display 111 as well as lamps provided at the steering and lamps provided around the steering. The output device 110 according to one or more embodiments of the present invention may output various information items regarding the travel assistance to external devices such as Intelligent Transport Systems (ITS) via the communication device 40. The external devices such as Intelligent Transport Systems use the information regarding the travel assistance, including the speed of the vehicle, steering information, traveling route, etc., for the traffic management of a plurality of vehicles.

Specific forms of outputting information will be described with reference to an example in which another vehicle traveling as the avoidance object exists at the forward left side of the subject vehicle traveling.

The output device 110 provides passengers of the subject vehicle with a direction and/or position in which another vehicle exists, as the information in accordance with the position of the avoidance object. The display 111 displays the direction and/or position in which another vehicle exists in a form that can be visually recognized. The speaker 112 reads out a text that informs the direction and/or position in which another vehicle exists, such as "Please be advised another vehicle exists at the forward left side." Among lamps provided as the exterior lamps 113 at left and right door mirrors, only the left-side lamp may be blinked to inform the subject vehicle's passengers that another vehicle exists at the forward left side. Among lamps provided as the interior lamps 114 at the left and right in the vicinity of the steering, only the left-side lamp may be blinked to inform the passengers that another vehicle exists at the forward left side.

The position and/or type of a lane marker can be output as the information in accordance with the position of the lane marker to inform the subject vehicle's passengers of such information via the display 111, speaker 112, exterior lamps 113, and/or interior lamps 114.

Furthermore, passengers of the subject vehicle or passengers of other vehicles may be preliminarily informed that the steering operation and/or acceleration or deceleration will be performed, as the information regarding travel control for the subject vehicle V1 by the travel control device 100, via the display 111, speaker 112, exterior lamps 113 and/or interior lamps 114.

Thus, by outputting the information regarding travel control for the subject vehicle V1, passengers of the subject vehicle and/or other vehicles can be preliminarily informed of the behavior of the subject vehicle. The output device 110 may output the above-described information to external devices, such as the Intelligent Transport Systems via the communication device 20. This allows the passengers of the subject vehicle and/or the passengers of other vehicles to respond to the behavior of the subject vehicle which is under the travel control.

The travel control device 100 according to one or more embodiments of the present invention will then be described.

As illustrated in FIG. 1, the travel control device 100 according to one or more embodiments of the present invention comprises a control device 10, communication device 20, and output device 30 including a display 31 and speaker 32. The communication device 20 exchanges information with the onboard apparatus 200. The output device 30 has a similar function to that of the previously-described output device 110 of the onboard apparatus 200. When the travel control device 100 is a computer that can be carried by a passenger, the travel control device 100 may output, to each device, command information for controlling the blinking of the exterior lamps 113 and/or interior lamps 114 of the onboard apparatus 200.

In the travel control device 100 according to one or more embodiments of the present invention, the control device 10 plans a target route for causing the subject vehicle V1 to travel in a lane of a road and drives the subject vehicle V1 on the target route thereby to perform travel control for the subject vehicle V1. The target route is appropriately updated by the control device 10 while the subject vehicle V1 is traveling.

The control device 10 of the travel control device 100 is a computer comprising: a ROM (Read Only Memory) 12 that stores programs for presenting different travel control information in accordance with the degree of proximity between the subject vehicle and another vehicle; a CPU (Central Processing Unit) 11 as an operation circuit that executes the programs stored in the ROM 12 to function as the travel control device 100; and a RAM (Random Access Memory) 13 that functions as an accessible storage device.

The control device 10 of the travel control device 100 according to one or more embodiments of the present invention has a subject vehicle information acquisition function, object information acquisition function, lane marker information acquisition function, control area setting function, object area setting function, route planning function, control function, and presentation function. The control device 10 according to one or more embodiments of the present invention executes each function by cooperation of software for realizing the above functions and the above-described hardware.

Each function of the travel control device 100 according to one or more embodiments of the present invention will be described below.

First, the subject vehicle information acquisition function of the control device 10 will be described. The control device 10 acquires information that includes the position of the subject vehicle as the subject vehicle information. The position of the subject vehicle can be acquired by the position detection device 121 of the navigation device 120. The above subject vehicle information further includes the vehicle speed and acceleration of the subject vehicle. The control device 10 acquires the speed of the subject vehicle from the vehicle speed sensor 62. The speed of the subject vehicle can also be acquired on the basis of a variation over time of the position of the subject vehicle. The acceleration of the subject vehicle can be obtained from the speed of the subject vehicle.

The object information acquisition function of the control device 10 will be described. The control device 10 acquires object information that includes the position of an avoidance object which the subject vehicle should avoid. The control device 10 acquires information that includes the position of the avoidance object detected by the detection device 50, as the object information. The above object information further includes a relative position, relative speed and relative acceleration of the avoidance object.

When the avoidance object is another vehicle and this other vehicle and the subject vehicle are capable of inter-vehicle communication (communication in which a plurality of vehicles can directly communicate with one another without using a server or the like), the control device 10 of the subject vehicle may acquire, as the object information, the vehicle speed and acceleration of the other vehicle detected by the vehicle speed sensor of the other vehicle. As will be understood, the control device 10 can also acquire avoidance information that includes the position, speed and acceleration of the other vehicle from external devices, such as the Intelligent Transport Systems (ITS).

The lane marker information acquisition function of the control device 10 will be described. In one or more embodiments of the present invention, the control device 10 acquires information that includes the positions of lane markers detected by the detection device 50 as the lane marker information.

The control area setting function, object area setting function and route planning function of the control device 10 will be described. In one or more embodiments of the present invention, the control device 10 first uses the control area setting function to set control areas with reference to lane markers and uses the object area setting function to set an object area for the avoidance object. Then, the control device 10 plans a target route RT on which the subject vehicle V1 is to travel, on the basis of the locations of the control areas and the location of the object area.

Figure 2A:
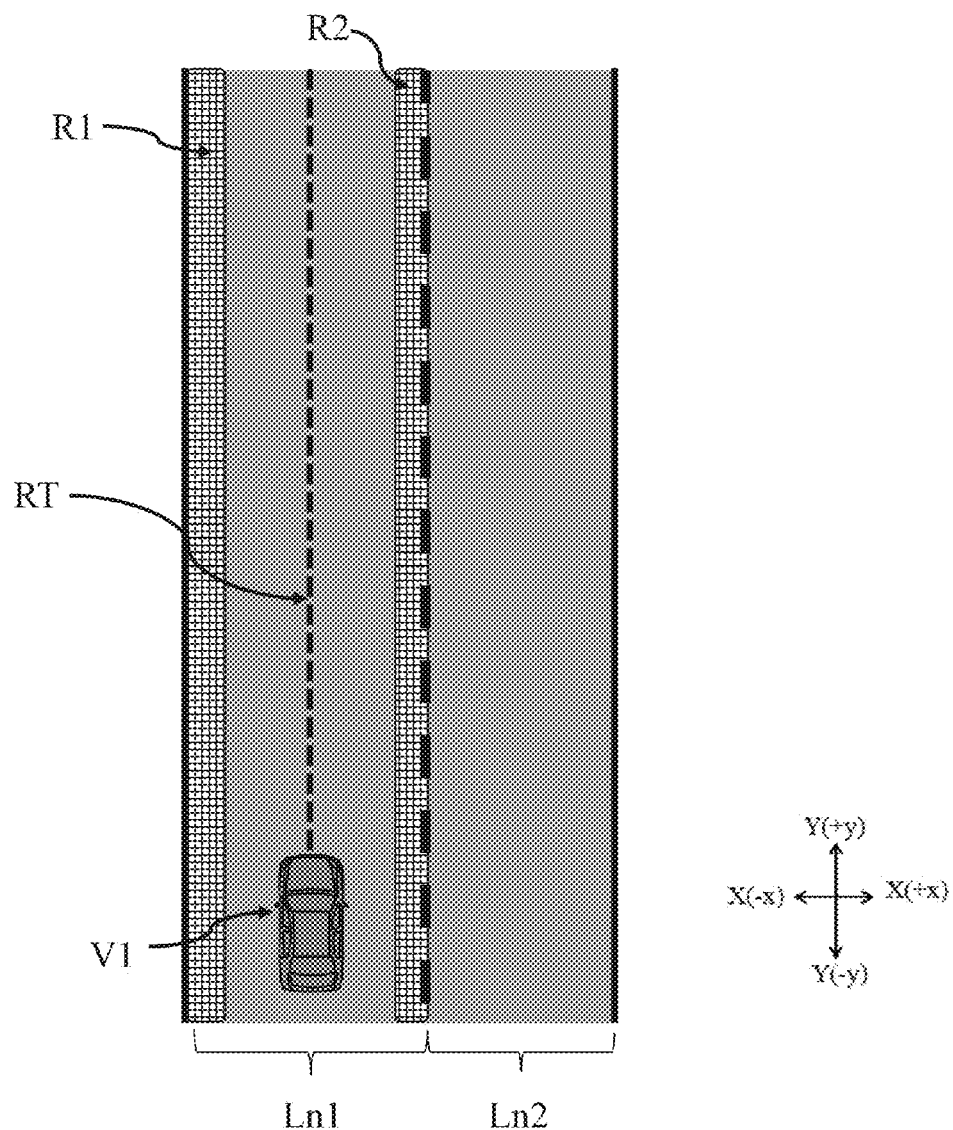
FIG. 2A is a plan view illustrating an example of control areas that are set with reference to lane markers around the subject vehicle.

In a method of planning the target route RT, the control device 10 plans the target route RT which passes between control areas that are planned with reference to lane markers existing around the subject vehicle. FIG. 2A is a top plan view illustrating a scene in which the subject vehicle V1 is traveling in a travel lane Ln1. The control device 10 sets, as illustrated in FIG. 2A, control areas R1 and R2 with reference to lane markers that define the travel lane Ln1 in which the subject vehicle V1 travels. When the road on which the subject vehicle V1 is traveling is a straight road (road without a branch), the control device 10 plans the target route RT on which the subject vehicle V1 is operated to travel near the center between the control areas R1 and R2.

When detecting that an avoidance object (another vehicle V2) exists around the subject vehicle V1 as illustrated in FIG. 2B, the control device 10 according to one or more embodiments of the present invention plans the target route RT which allows the subject vehicle V1 to avoid the avoidance object. FIG. 2B is a view when viewing from above a scene of detecting another vehicle V2 that is parked at the left-side road shoulder of the travel lane Ln1 for the subject vehicle. The detected other vehicle V2 exists in the travel lane Ln1 for the subject vehicle V1 and is therefore an avoidance object which the subject vehicle V1 should avoid because the other vehicle V2 will interfere the subject vehicle V1 traveling straight ahead. In the scene illustrated in FIG. 2B, the control device 10 can plan the target route RT so as to avoid an object area RV2 that is set by the object area setting function (i.e. so as to pass by the side of the object area RV2). Alternatively, the control device 10 may plan the target route RT so as to avoid the other vehicle V2 (i.e. so as to pass by the side of the other vehicle V2) in accordance with the position of the other vehicle V2 without setting an object area RV2).

In a method of planning the target route RT, the control device 10 can plan the target route RT, for example, by calculating one or more target coordinates and connecting the current position of the subject vehicle V1 and the target coordinates.

The above-described object area may be set with consideration for avoiding a state in which the distance between the subject vehicle V1 and the avoidance object becomes less than a predetermined value so that they come close to each other or come into contact with each other, or may also be set with consideration for the subject vehicle V1 and the avoidance object to maintain an appropriate distance. In one or more embodiments of the present invention, the object area may have a shape that analogously follows the outer shape of an avoidance object or may also have a shape that includes an avoidance object. The control device 10 may set the border of the object area as a shape that analogously follows the outer shape of an avoidance object or as a shape that includes an avoidance object, such as a circular shape, elliptical shape, rectangular shape, and polygonal shape. The object area may be set narrow such that the boundary of the object area is separate from the surface (outer edge) of an avoidance object by less than a predetermined distance (A) or may also be set wide such that the boundary of the object area is separate from the avoidance object by a predetermined distance B (B>A) or more.

In one or more embodiments of the present invention, the control device 10 may calculate the target route RT such that the subject vehicle V1 does not enter the object area which is set for an avoidance object, may calculate the target route RT such that an area at which the object area and a possible existence area of the subject vehicle V1 overlap each other is less than a predetermined value, may calculate a sequence of positions separate from the boundary of the object area by a predetermined distance as the target route RT, or may calculate the boundary itself of the object area as the target route RT. As previously described, the object area is set such that the distance between the subject vehicle V1 and the avoidance object does not become less than a predetermined value or such that the distance between the subject vehicle V1 and the avoidance object is maintained at a predetermined threshold. Consequently, the target route RT is also set at a location at which the distance between the subject vehicle V1 and the avoidance object does not become less than the predetermined value or at a location at which the distance between the subject vehicle V1 and the avoidance object is maintained at the predetermined threshold.

In the above-described example of FIG. 2B, an exemplary case is described in which the other vehicle V2 as the avoidance object is a parked vehicle that exists in the travel lane Ln1 for the subject vehicle, but also in cases where the avoidance object exists in a lane other than the travel lane Ln1 for the subject vehicle or where the avoidance object is traveling, the object area RT is set for avoiding the avoidance object. In one or more embodiments of the present invention, the control device 10 uses the control function, which will be described later, to operate the subject vehicle V1 to travel on the target route RT which is planned in the above manner.

When, as illustrated in FIG. 2B, there is another vehicle V3 traveling in the opposite direction in an oncoming lane Ln2 of the travel lane Ln1 for the subject vehicle V1, the other vehicle V3 is also detected as an avoidance object. Although not illustrated in the figure, when the other vehicle V3 is detected as an avoidance object, an object area can be set within a region that includes the other vehicle V3, in the same manner. In this case, the control device 10 determines whether or not a target route RT can be planned which allows the subject vehicle to pass by the oncoming other vehicle V3 while avoiding the other vehicle V2. If, hypothetically, a determination is made that a target route RT cannot be planned which allows the subject vehicle V1 to pass by the oncoming other vehicle V3 while avoiding the other vehicle V2, the control device 10 commands the vehicle controller 70 of the travel control device 100 to control the braking quantity of each wheel of the subject vehicle V1 using the braking device 81 of the driving device 80 and operates the subject vehicle V1 to stop short of the other vehicle V2 (at the side of −y) and wait until the other vehicle V3 passes.

In one or more embodiments of the present invention, the control device 10 may set an avoidance amount when avoiding an avoidance object, that is, a control amount for the travel position of the subject vehicle V1 along the width direction of the travel lane Ln1, in accordance with the classification of the detected avoidance object. For example, as illustrated in FIG. 2C, when the detected avoidance object is a two-wheel vehicle V4, the control device 10 sets the object area RV4 and target route RT such that the avoidance amount when the subject vehicle V1 avoids the avoidance object is relatively large.

Examples of the classification of an avoidance object include two-wheel vehicles, such as bicycles and motorbikes; large-sized vehicles, such as buses and trucks; special-purpose vehicles, such as trailers and crane cars; emergency vehicles, such as ambulance cars, fire truck and police cars; standard-sized cars; and stationary objects (such as road structure and road equipment). In one or more embodiments of the present invention, the control device 10 increases the avoidance amount when causing the subject vehicle V1 to avoid the avoidance object, for example, as a degree of attention increases which is required for the driver to drive the subject vehicle V1. The degree of attention as used herein refers to a value that is preliminarily set for each vehicle type. In view of traffic safety, the higher the degree of attention which the driver should pay when driving the subject vehicle V1 is, the larger the value is to be set.

In an example of setting the degree of attention, for example, the highest degree of attention is set for vulnerable road users (such as bicycles and motorbikes) and emergency vehicles (such as ambulance cars and fire truck), the second-highest degree of attention is set for special-purpose vehicles (such as trailers and crane cars) and large-sized vehicles (such as buses and trucks), the third-highest degree of attention is set for standard-sized cars, and the lowest degree of attention is set for stationary objects (such as road structure and road equipment). Such setting allows an appropriate avoidance amount to be set in accordance with the classification of an avoidance object when the subject vehicle V1 is operated to avoid the avoidance object. During this operation, the higher the degree of attention is set in accordance with the classification of an avoidance object, the earlier the timing may be set for causing the subject vehicle V1 to start avoidance of the avoidance object.

As the above, in one or more embodiments of the present invention, the control areas, object area and target route RT are set/planned using the control device 10.

Figure 3:
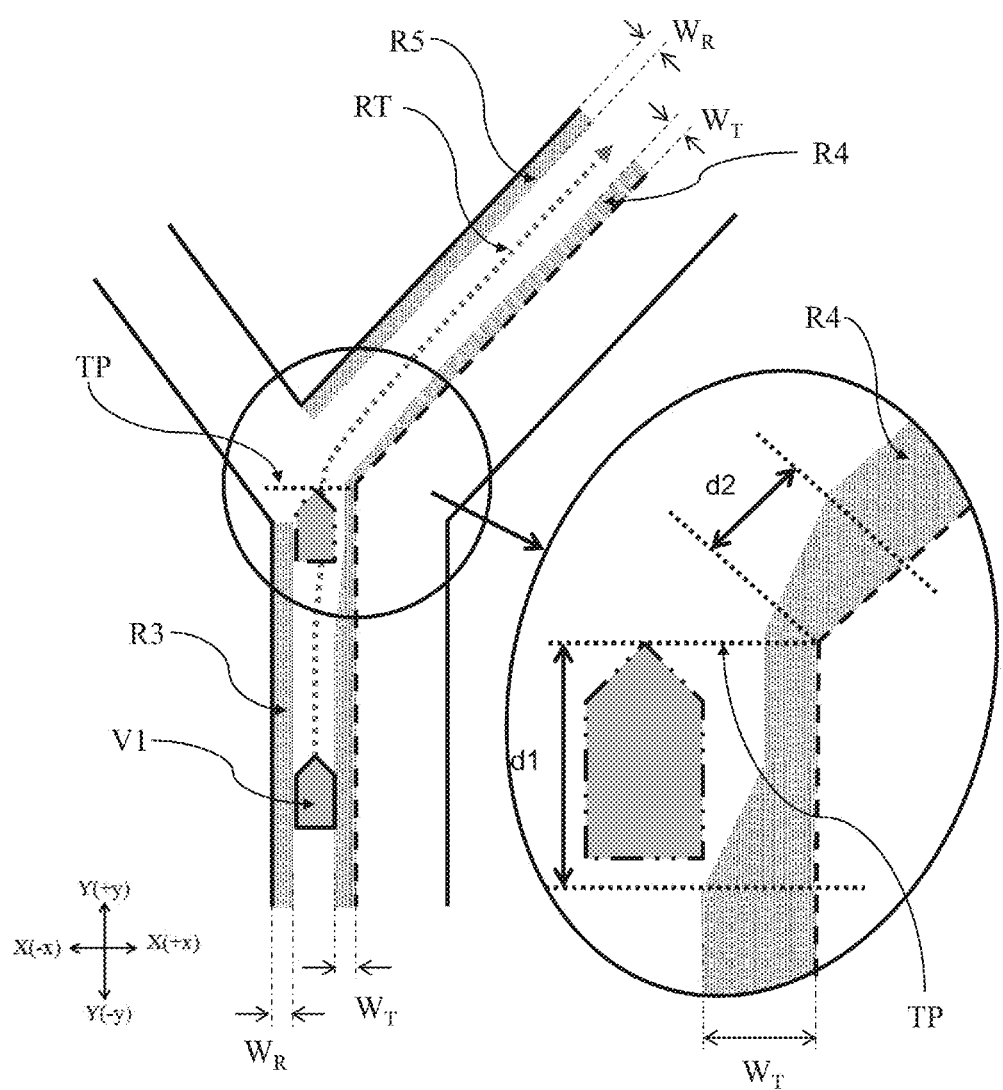
FIG. 3 is a plan view illustrating an example of control areas that are set with reference to lane markers around a Y-shaped intersection (course change point)

As illustrated in FIG. 3, the present invention can be applied to a branch, such as a Y-shaped intersection (which refers to a Y-shaped three-way junction, but the present invention can be applied to a T-shaped three-way junction and the description will be made to a Y-shaped intersection as a representative). Such a branch represents a course change point TP. At the course change point TP, the control device 10 according to one or more embodiments of the present invention extracts a lane marker crossing a width direction line that includes the course change point TP and extends by a predetermined distance/length. The subject vehicle V1 starts course change at the course change point TP, which is located ahead the subject vehicle V1 in its travel direction. Control areas are set with reference to the extracted lane marker. The control device 10 adjusts widths of the control areas thereby to plan a target route RT such that, when the subject vehicle V1 is operated to change its course at the course change point TP, the travel position of the subject vehicle deviates toward the course change side. In one or more embodiments of the present invention, the course change point TP refers to a point at which the subject vehicle V1 starts course change, that is, as illustrated by the dashed-two dotted line in the circle of FIG. 3, a point at which the subject vehicle V1 starts turning (when the course change is performed based on the rotational speed difference between the right and left drive wheels as will be described later, "turning," when the course change is performed using the steering wheel, "steering"). In the present example, the line in the road width direction at which the curvature of the road varies is illustrated as representing the course change point TP for the descriptive purposes, such as in FIG. 3.

Here, FIG. 3 illustrates a scene in which the subject vehicle V1 is traveling toward the Y-shaped intersection and changes the course to the right at the Y-shaped intersection. In FIG. 3, control areas R3 to R5 are set with reference to respective lane markers that exist on the road on which the subject vehicle V1 is traveling, and lane markers existing near the Y-shaped intersection are enlarged and illustrated in the circle.

In one or more embodiments of the present invention, specifically, the control area R4 at the course change side of the subject vehicle V1 (at the right side of the subject vehicle V1) is set, as illustrated in FIG. 3, to have a reduced width WT within a region defined by a predetermined distance d1 from the course change point TP toward the subject vehicle V1. Through this setting, the width WR of the control area R3 associated with the width WT of the control area R4 within that region is relatively large and the target route RT, which is set between the control areas R3 and R4, more deviates toward the course change side in the vicinity of the course change point TP. As a result, when the subject vehicle V1 changes its course at the course change point TP, the travel position of the subject vehicle V1 in the travel lane can be preliminarily deviated in a direction in which the subject vehicle V1 changes its course. That is, in the scene illustrated in FIG. 3, since the subject vehicle V1 changes its course to the right at the Y-shaped intersection, the target route RT is planned such that the subject vehicle V1 travels while deviating rightward in the lane in which the subject vehicle V1 travels, and thereafter changes the course to the right at the Y-shaped intersection.

In one or more embodiments of the present invention, the control area R4 at the course change side of the subject vehicle V1 is set, as illustrated in FIG. 3, to have a reduced width WT within a region defined by a predetermined distance d2 from the course change point TP toward ahead the subject vehicle V1. Through this setting, the width WR of the control area R5 associated with the width WT of the control area R4 within that region is relatively large and the target route RT, which is set between the control areas R3 and R5, more deviates toward the course change side in the vicinity of the course change point TP. As a result, the travel point of the subject vehicle V1, which is deviated toward the course change side before the subject vehicle V1 travels at the course change point TP, can be smoothly recovered to near the center of the lane in which the subject vehicle V1 travels, after the subject vehicle V1 passes the course change point TP.

The above-described example illustrated in FIG. 3 exemplifies a method of planning the target route RT which allows the subject vehicle V1 to deviate toward the course change side. In this method, the width WT of the control area R4 is reduced in the vicinity of the course change point TP. The present invention, however, is not limited to such an example. That is, in one or more embodiments of the present invention, when the control areas R3 and R5 are located at the opposite side to the control area R4 which is located at the course change side of the subject vehicle V1, it may suffice that the ratio (WR/WT) of the width WR of the control area R3 and/or R5 to the width WT of the control area R4 can be set larger in the vicinity of the course change point TP than that in other locations. For example, the control device 10 may increase the width WR of the control area R3 and/or R5 in the vicinity of the course change point TP thereby to increase the above-described ratio (WR/WT) of the widths of control areas.

In this setting, in view of smoothly performing control of the travel position when the subject vehicle V1 changes its course, the control device 10 sets, within a region of a predetermined distance d1 from the course change point TP, an area in which the above-described ratio (WR/WT) of the widths of control areas increases as approaching the course change point TP. For example, as illustrated in FIG. 3, the control device 10 sets, within a region of the predetermined distance d1 from the course change point TP, an area in which the width WT of the control area R4 decreases as approaching the course change point TP. Similarly, in view of smoothly performing control of the travel position after the subject vehicle V1 changes its course, the control device 10 sets, within a region of a predetermined distance d2 from the course change point TP, an area in which the above-described ratio (WR/WT) of the widths of control areas decreases as separating from the course change point TP. For example, as illustrated in FIG. 3, the control device 10 sets, within a region of the predetermined distance d2 from the course change point TP, an area in which the width WT of the control area R4 increases as separating from the course change point TP.

In one or more embodiments of the present invention, the predetermined distance d1 is set larger than the predetermined distance d2. Through this planning, the target route is planned such that the subject vehicle V1 deviates toward the course change side from a point located more before the course change point TP (on the near side of the subject vehicle) because the predetermined distance d1 is set larger. Moreover, the target route RT is planned such that the subject vehicle V1 can be recovered to near the center of the lane relatively soon after changing the course because the predetermined distance d2 is set smaller. This allows smooth control of the travel position when the subject vehicle V1 changes its course. As a result, an uncomfortable feeling given to the passengers of the subject vehicle V1 is mitigated, and passengers of other vehicles traveling around the subject vehicle V1 can expect the behavior of the subject vehicle V1. Thus, this setting is preferred from the viewpoint of improving safety.

In one or more embodiments of the present invention, the width WT of the control area R4, which is set at the course change side of the subject vehicle V1, is set to be the same width at an end that is closest to the course change point TP (finish end) within a region defined by the predetermined distance d1 and at an end that is closest to the course change point TP (start end) within a region defined by the predetermined distance d2. That is, the width WT of the control area R4 is continuous at the finish end of the region defined by the predetermined distance d1 and at the start end of the region defined by the predetermined distance d2. This planning allows the target route RT to be planned such that the subject vehicle V1 can smoothly travel in the vicinity of the course change point TP.

FIG. 3 illustrates an example in which the finish end of the predetermined distance d1 and the start end of the predetermined distance d2 are set with reference to the vertex of lane markers that exist at the right side of the subject vehicle V1, but the finish end of the predetermined distance d1 and the start end of the predetermined distance d2 may also be set with reference to the vertex of lane markers that exist at the left side of the subject vehicle V1. When lane markers have no vertex and are in a curved shape, the finish end of the predetermined distance d1 and the start end of the predetermined distance d2 may be set with reference to the curved part of the lane markers.

In one or more embodiments of the present invention, the higher the travel speed of the subject vehicle V1 is expected to be, that is, the higher the speed limit of the road on which the subject vehicle V1 travels is, the longer the control device 10 may set the above-described distances d1 and d2. This setting allows the target route RT to be appropriately planned in accordance with the travel speed of the subject vehicle V1. In addition or alternatively, the control device 10 may set the lengths of the predetermined distances d1 and d2 in accordance with the road type, road shape and the number of lanes of the road on which the subject vehicle V1 travels. Examples of the road type include types of a general road and highway. Examples of the road shape include shapes of intersections (such as Y-shaped intersection, T-shaped intersection and crossroads) and shapes of highway entrances and exits, which will be described later.

In one or more embodiments of the present invention, a method of performing travel control for the subject vehicle V1 is exemplified as the above, but when a steering operation by a driver of the subject vehicle V1 is performed while the travel control for the subject vehicle V1 is performed, the travel control is prohibited. For example, in the scene illustrated in FIG. 3, when a passenger of the subject vehicle V1 performs a steering operation while the subject vehicle V1 deviates toward the course change side at the course change point TP, the control device 10 prohibits the travel control. In such a case where the travel control is prohibited, the travel control for the subject vehicle V1 may be resumed at appropriate timing, such as when the passenger of the subject vehicle V1 performs an operation of initiating the travel control, when the passenger of the subject vehicle V1 completes the steering operation, and when a predetermined time passes or a predetermined travel distance is reached after the subject vehicle V1 passes the course change point TP.

The above-described examples exemplify a scene in which the travel route of the subject vehicle V1 (i.e. the direction in which the subject vehicle V1 changes its course) is preliminarily planned, but when the travel route of the subject vehicle V1 is not set, the control device 10 sets control areas in the vicinity of the course change point TP such that the target route RT can be set which allows the subject vehicle V1 to travel near the center of the lane even in the vicinity of the course change point TP. For example, the control device 10 sets the control areas such that the above-described ratio (WR/WT) of the widths of control areas becomes a value that is approximately one (1) in the vicinity of the course change point TP.

In one or more embodiments of the present invention, the location at which the course change point TP is set may be a location that allows the subject vehicle V1 to change its course. Examples of such a location include three-way junctions, such as a Y-shaped intersection as illustrated in FIG. 3 and T-shaped intersection; four-way junctions, such as a crossroads and K-shaped intersection; and multi-way junctions, such as a five-way intersection. Examples will be described in which the present invention is applied to a crossroads intersection as a typical intersection. As will be understood, however, examples of a location at which the course change point TP is set further include those that are not intersections but allow the subject vehicle V1 to change its course, such as locations near highway entrances and exits.

Figure 4:
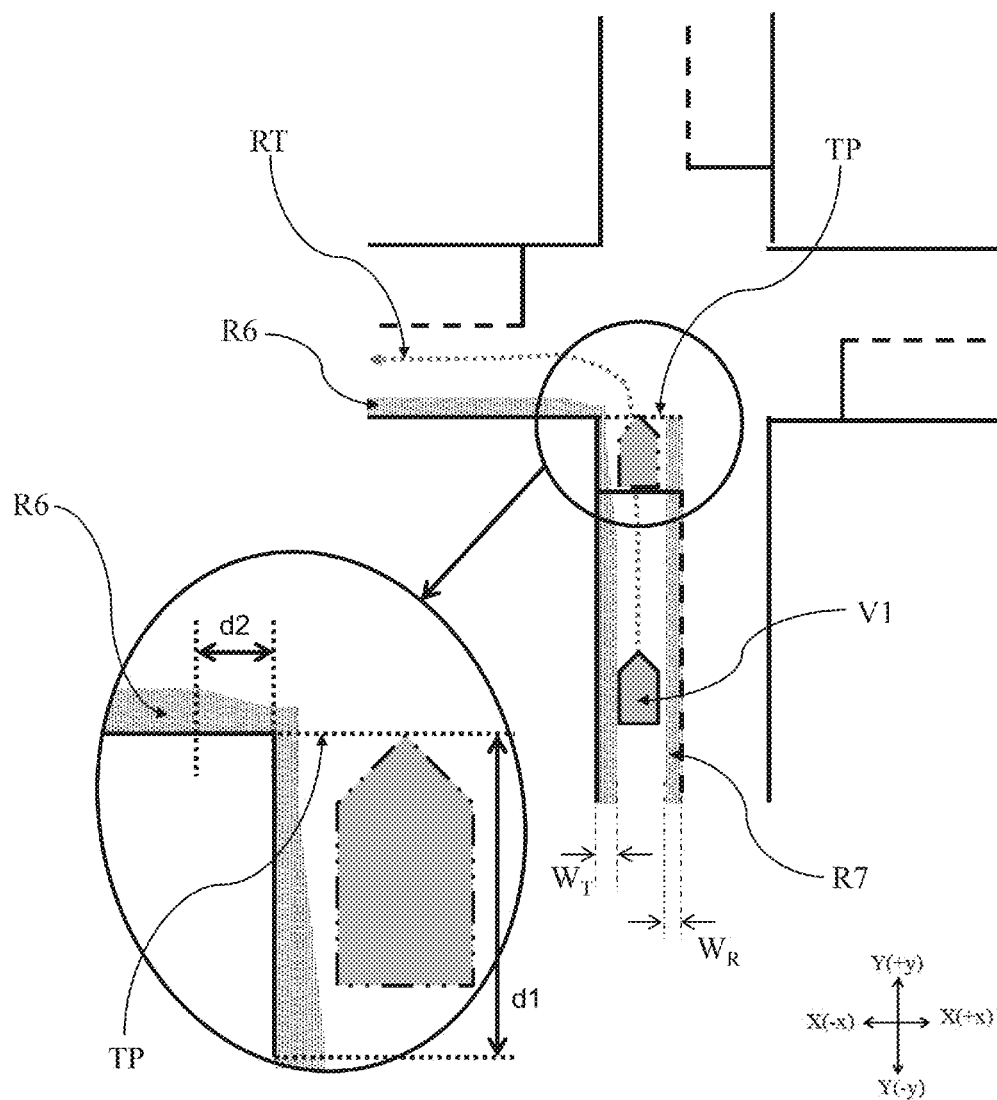
FIG. 4 is a plan view illustrating an example of control areas that are set with reference to lane markers around a crossroads (course change point)

In one or more embodiments of the present invention, also when the subject vehicle V1 travels through a crossroads as illustrated in FIG. 4, the above-described ratio (WR/WT) of the widths of control areas is set large in the vicinity of the crossroads as the course change point TP in a similar manner to the above. For example, as illustrated in FIG. 4, a control area R6 is set with reference to lane markers that exist at the left side of the subject vehicle V1 and a control area R7 is set with reference to lane markers that exist at the right side of the subject vehicle V1. In a scene in which the subject vehicle V1 changes its course to the left at the crossroads, the control device 10 sets the ratio (WR/WT) of the width WR of the control area R7 to the width WT of the control area R6 to be large, such as by relatively reducing the width WT of the control area R6 in the vicinity of the crossroads. Through this setting, also when the subject vehicle V1 changes its course at the crossroads, a target route RT can be planned with which the subject vehicle V1 is controlled to deviate toward the course change side at the course change point TP.

Figure 5:
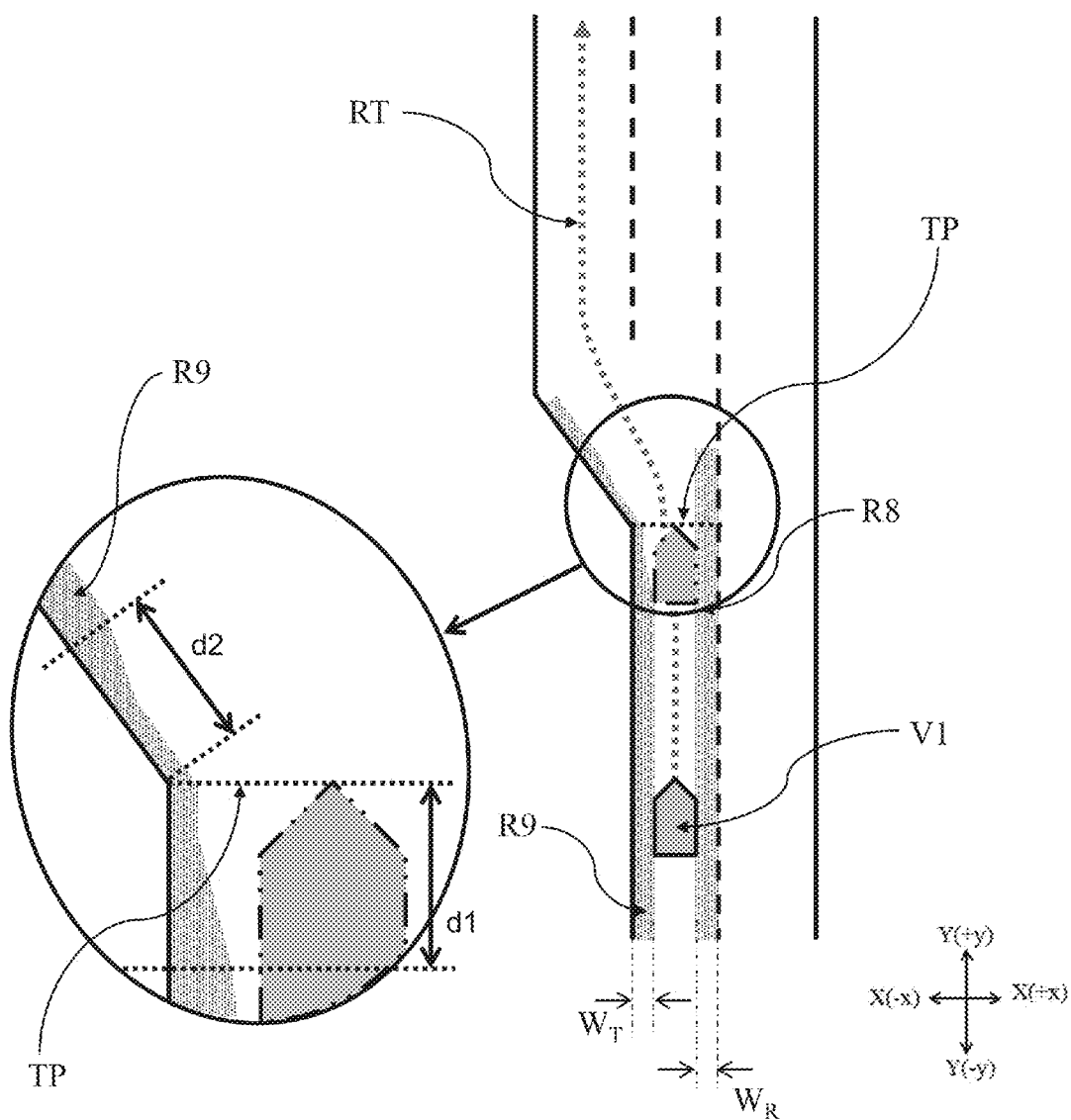
FIG. 5 is a plan view illustrating an example of control areas that are set with reference to lane markers around a highway exit (course change point)

In one or more embodiments of the present invention, also when the subject vehicle V1 travels at a course change point TP that is connected with a highway exit as illustrated in FIG. 5, the above-described ratio (WR/WT) of the widths of control areas is set large in the vicinity of the course change point TP in a similar manner to the above. For example, as illustrated in FIG. 5, a control area R8 is set with reference to lane markers that exist at the right side of the subject vehicle V1 and a control area R9 is set with reference to lane markers that exist at the left side of the subject vehicle V1. In a scene in which the subject vehicle V1 changes its course to the left, the control device 10 sets the ratio (WR/WT) of the width WR of the control area R8 to the width WT of the control area R9 to be large, such as by relatively reducing the width WT of the control area R9 in the vicinity of the course change point TP.

In one or more embodiments of the present invention, when it is expected that an avoidance object exists around the subject vehicle V1 at a moment when the subject vehicle V1 passes the course change point TP, the object area set for the avoidance object is made small and better travel control can thereby be performed for the subject vehicle V1.

Figure 6:
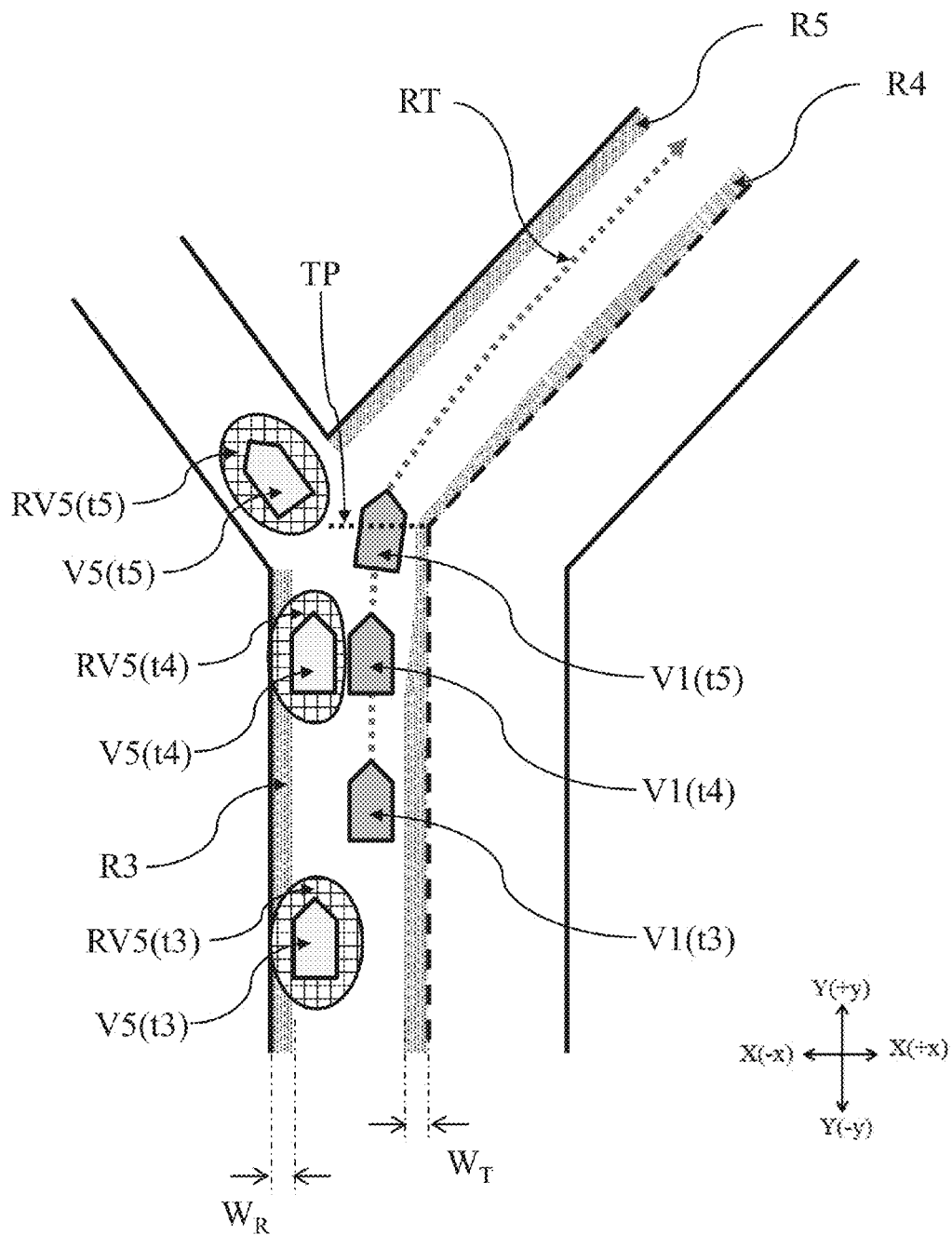
FIG. 6 is a plan view for describing a process for the subject vehicle to travel through a Y-shaped intersection while avoiding another vehicle that passes by the subject vehicle.

FIG. 6 illustrates a scene in which, when the subject vehicle V1 changes its course to the right at a Y-shaped intersection, another vehicle V5 passes by or overtakes the subject vehicle V1 at the left side of the subject vehicle V1. In FIG. 6, V1 (t3) to V1 (t5) represent positions of the subject vehicle V1 at time t3 to time t5, respectively. V5(t3) to V5(t5) and RV5(t3) to RV5(t5) represent positions of the other vehicle V5 and object areas set for the other vehicle V5 at time t3 to time t5, respectively.

In one or more embodiments of the present invention, in the scene illustrated in FIG. 6, when it is expected that the other vehicle V5 comes close to the subject vehicle V1 at a moment when the subject vehicle V1 changes its course at the Y-shaped intersection (at a moment when the subject vehicle V1 is located at the position of V1(t4)), the object area RV5(t4) for the other vehicle V5 at the position of V5(t4) is set smaller than those when the other vehicle V5 is located at other positions (V5(t3) and V5(t5)). Specifically, as illustrated in FIG. 6, a part of the object area RV5 (t4) that extends in the direction from the other vehicle V5 toward the subject vehicle V1 (+x direction) is set smaller than other parts. Reducing the object area RV5(t4) as described above allows the target route RT to be planned with a small avoidance amount for the other vehicle V5 at time t4, as illustrated in FIG. 6, and the subject vehicle V1 is less likely to excessively deviate toward the course change side. That is, after the subject vehicle V1 deviates toward the course change side, the subject vehicle V1 is less likely to further deviate toward the course change side in order to avoid the other vehicle V5.

In one or more embodiments of the present invention, provided that the subject vehicle V1 changes its course at the course change point TP, when the subject vehicle V1 passes by another vehicle that travels in an oncoming lane, a control amount for the subject vehicle V1 to deviate toward the course change side is reduced in the vicinity of the course change point TP.

Figure 7:
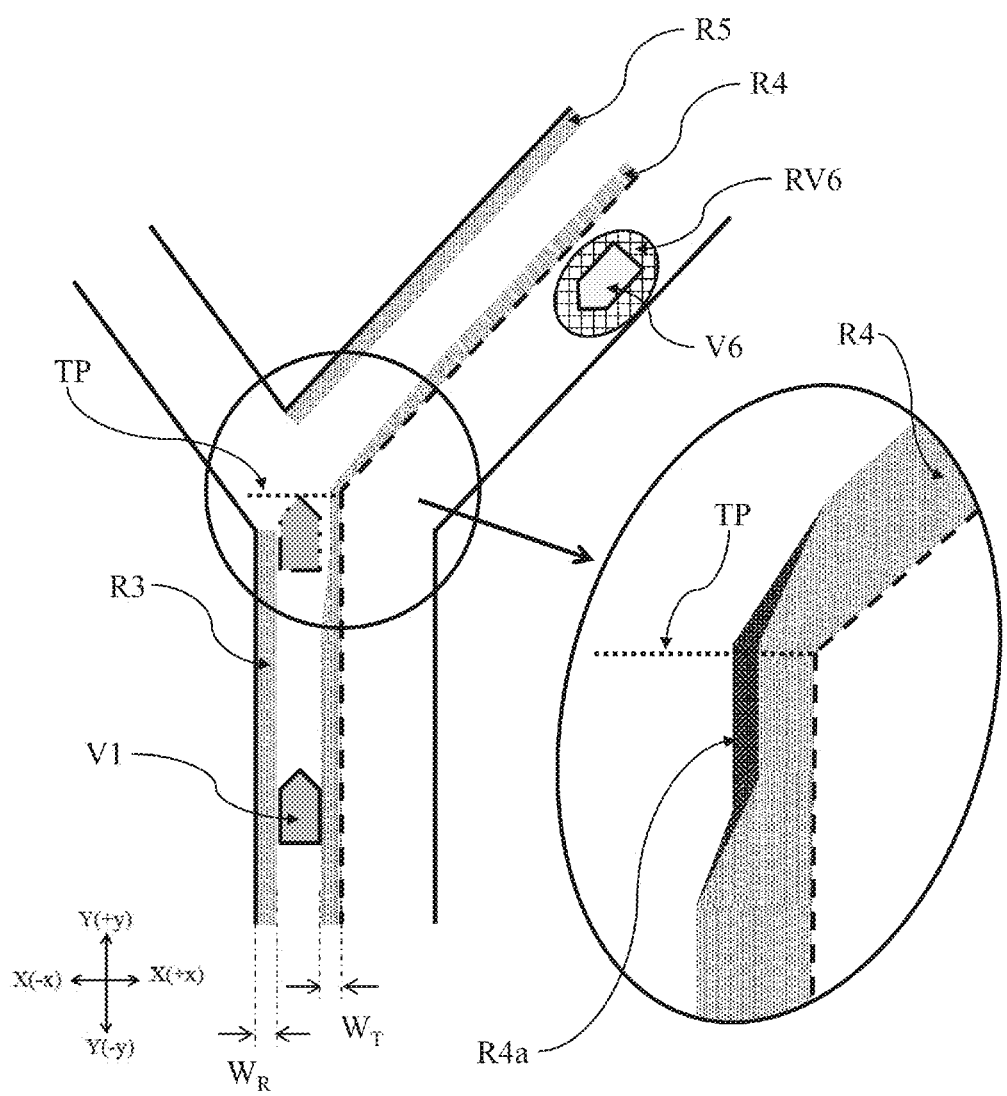
FIG. 7 is a plan view for describing a process for the subject vehicle to travel through a Y-shaped intersection while avoiding an oncoming vehicle.

FIG. 7 is a view illustrating a similar scene to the above-describe scene of FIG. 3 except that another vehicle V6 traveling on an oncoming lane passes by the subject vehicle V1 in the vicinity of a Y-shaped intersection. In one or more embodiments of the present invention, provided that the subject vehicle V1 changes its lane to the right at the Y-shaped intersection, when the subject vehicle V1 passes by the other vehicle V6, the ratio (WR/WT) of the widths of control areas in the vicinity of the Y-shaped intersection is set smaller than that in the above-described scene illustrated in FIG. 3.

For example, in the scene illustrated in FIG. 7, the control device 10 sets the width WT of the control area R4 in the vicinity of the Y-shaped intersection to be wider than the width WT of the control area R4 illustrated in FIG. 3 by an amount of R4a illustrated in FIG. 7. The ratio (WR/WT) of the widths of control areas is thereby set small. Through this setting, in a scene in which the subject vehicle V1 changes its course at the course change point TP and passes by the other vehicle V6 traveling in the oncoming lane, the target route RT is planned with a reduced amount of deviating the subject vehicle V1 toward the course change side. As a result, the subject vehicle V1 can be prevented from excessively coming close to the other vehicle V6.

In one or more embodiments of the present invention, when the subject vehicle V1 overtakes or passes by an avoidance object before reaching the course change point TP, the object area for the avoidance object is set small.

Figure 8:
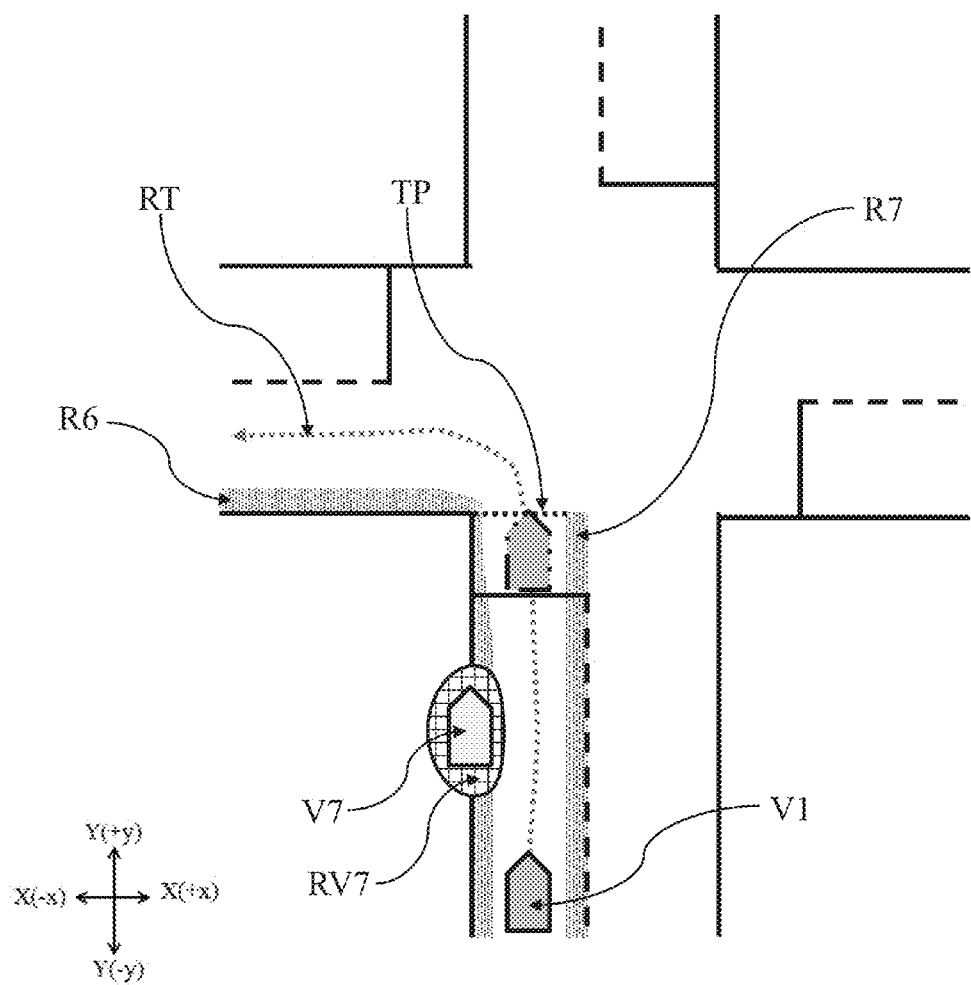
FIG. 8 is a plan view for describing a process for the subject vehicle to travel through a crossroads after avoiding a parked vehicle.

FIG. 8 is a view illustrating a similar scene to the above-describe scene of FIG. 4 except that another vehicle V7 is parked short of a crossroads and an object area RV7 is set for the other vehicle V7. In the scene illustrated in FIG. 8, for example, the control device 10 according to one or more embodiments of the present invention sets a reduced object area RV7 for the other vehicle V7. Specifically, as illustrated in FIG. 8, a part of the object area RV7 that extends in the direction from the other vehicle V7 toward the subject vehicle V1 (+x direction) is set smaller than other parts. The subject vehicle V1 attempts to avoid the avoidance object before changing the course at the course change point TP, but the above setting can prevent the travel position from varying in the opposite direction to the course change side. This will be more specifically described. In the scene of FIG. 8, the subject vehicle V1 has to be temporarily deviated rightward to avoid the other vehicle V7 before the subject vehicle V1 is operated to change the course to the left at the crossroads. In this operation, the object area RV7 is set small as described above thereby to allow the target route RT to be planned with a reduced avoidance amount for the subject vehicle V1 to avoid the other vehicle V7. As a result, the subject vehicle V1 can be prevented from deviating toward the opposite side to the course change side.

Next, the control function of the control device 10 will be described. The control function is used to output command information for causing the subject vehicle V1 to travel on the target route RT to the vehicle controller 70, driving device 80, and steering device 90.

Acquiring the command information from the control device 10, the vehicle controller 70 controls the driving device 80 and steering device 90 to operate the subject vehicle V1 to travel along the target route RT. The vehicle controller 70 performs control of the steering device 90 such that the subject vehicle travels while maintaining a certain lateral position to the lane, using the road shape detected by the detection device 50, the road information 122 from the navigation device 120, and a lane marker model stored in the map information 123. The vehicle controller 70 calculates a steering control amount on the basis of the steering angle acquired from the steering angle sensor 61, the vehicle speed acquired from the vehicle speed sensor 62, and information on the current for a steering actuator and sends a current command to the steering actuator to perform the control such that the subject vehicle travels at a target lateral position. The method of controlling the lateral position of the subject vehicle V1 is not limited to using the above-described steering device 90. In addition or alternatively, the driving device 80 and/or the braking device 81 may be used to control the travel direction (i.e. lateral position) of the subject vehicle V1 on the basis of the rotational speed difference between the right and left drive wheels. In this sense, the "turning" of a vehicle is intended to encompass the cases of using the driving device 80 and/or the braking device 81 in addition to the cases of using the steering device 90.

Thus, in one or more embodiments of the present invention, when lane markers and an avoidance object are detected, a target route RT is planned on the basis of positions of the lane markers and avoidance object. Then, the travel control is performed such that the subject vehicle V1 travels along the target route RT. Moreover, in one or more embodiments of the present invention, detection of an avoidance object, calculation of the target route RT, and travel control based on the target route RT are repeatedly performed at regular intervals. This allows the control device 10 to sequentially plan the target route RT for the subject vehicle V1 on the basis of the updated surrounding situations around the subject vehicle V1. Therefore, the subject vehicle V1 can travel on a route suitable for the surrounding situations around the subject vehicle V1.

Finally, the presentation function of the control device 10 according to one or more embodiments of the present invention will be described. The control device 10 sends information in accordance with the positions of lane markers, information in accordance with the position of an avoidance object, and information regarding the travel control for the subject vehicle V1 by the travel control device 100 to the output device 110, which then outputs them to the external in the above-described form.

A travel control process according to one or more embodiments of the present invention will then be described with reference to the flowcharts of FIGS. 9 and 10. The contents of the process in each step are as described above and the flow of the process will be mainly described below.

In step S101, the control device 10 acquires subject vehicle information that includes at least the position of the subject vehicle V1. The subject vehicle information may further include the vehicle speed and/or acceleration of the subject vehicle V1. In step S102, the control device 10 acquires, from the detection device 50, lane marker information that includes the positions of lane markers existing around the subject vehicle V1, object information that includes the position of an avoidance object which the subject vehicle V1 should avoid. As will be understood, the object information may further include the speed and/or acceleration of the avoidance object.

In step S103, the control device 10 acquires the detection result of lane markers and an avoidance object from the detection device 50. The detection result of lane markers and an avoidance object includes information on positions of the lane markers and avoidance object. In step S104, the control device 10 sets control areas in accordance with the positions of the lane markers and also sets an object area in accordance with the position of the avoidance object.

In step S105, the control device 10 calculates target coordinates and target route RT1 for avoiding the object area. The target coordinates and target route target route RT pass between a pair of lane markers that define a lane in which the subject vehicle V1 travels. The target route RT includes one or more target coordinates at which the subject vehicle V1 is to travel. Each target coordinate includes a target lateral position (target X-coordinate value) and a target longitudinal position (target Y-coordinate value). The control device 10 obtains the target route RT by connecting the calculated one or more target coordinates and the current position of the subject vehicle V1. A method of calculating the target coordinates in step S105 will be described later.

In step S106, the control device 10 acquires the target lateral position or positions of the target coordinate or coordinates calculated in step S105. In step S107, the control device 10 compares the current lateral position of the subject vehicle V1 with the target lateral position or positions acquired in step S106 and calculates a feedback gain for the lateral position on the basis of the comparison result.

In step S108, the control device 10 calculates a target control value on the basis of the actual lateral position of the subject vehicle V1, the target lateral position corresponding to the current position, and the feedback gain of step S107. The target control value relates to a steering angle, steering angular velocity and other necessary parameters for moving the subject vehicle V1 onto the target lateral position. Then, in step S112, the control device 10 outputs the calculated target control value to the onboard apparatus 200. This allows the subject vehicle V1 to travel on the target route RT which is defined by the target lateral position. When a plurality of target coordinates is calculated in step S105, the process of steps S106 to S112 are repeated every time the target lateral position is acquired, and the target control value for each target lateral position acquired is output to the onboard apparatus 200.

In step S109, the control device 10 acquires the target longitudinal position or positions of the one or more target coordinates calculated in step S105. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison result. In step S111, the control device 10 calculates a target control value for the longitudinal position on the basis of the vehicle speed and acceleration corresponding to the target longitudinal position and the feedback gain for the longitudinal position calculated in step S110. As in the previously-described steps S106 to S108 and S112, the process of steps S109 to S112 are repeated every time the target longitudinal position is acquired, and the target control value for each target longitudinal position acquired is output to the onboard apparatus 200.

Here, the target control value for the longitudinal position (in the longitudinal direction) refers to a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed corresponding to the target longitudinal position. For example, in an engine car, the control function is used to calculate a target amount of intake air (target opening degree of the throttle valve) and a target amount of fuel injection on the basis of calculated values of the current and target acceleration, deceleration and vehicle speed and send them to the driving device 80. Alternatively, the control function may be used to calculate the acceleration, deceleration and vehicle speed and send them to the vehicle controller 70, which may calculate a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve these acceleration, deceleration and vehicle speed.

The routine then proceeds to step S112 in which the control device 10 outputs the target control value for the longitudinal position (in the longitudinal direction) calculated in step S111 to the onboard apparatus 200. The vehicle controller 70 executes the steering control and drive control to operate the subject vehicle to travel on the target route RT which is defined by the target lateral position and target longitudinal position.

In step S113, the control device 10 controls the output device 110 to present information. The information presented by the output device 110 may be the information on the object area calculated in step S104, the shape of target route RT calculated in step S105, and/or the target control value output to the onboard apparatus 200 in step S112.

In step S114, the control device 10 determines whether the driver intervenes in the operation, such as whether the driver performs the steering operation. When the operation by the driver is not detected, the routine returns to step S101, from which the setting of a new object area, calculation of a target route, and travel control are repeated. On the other hand, when the operation by the driver is detected, the routine proceeds to step S115, in which the travel control is prohibited. Step S115 is followed by step S116, in which presentation of information is made that the travel control is prohibited.

Figure 10:
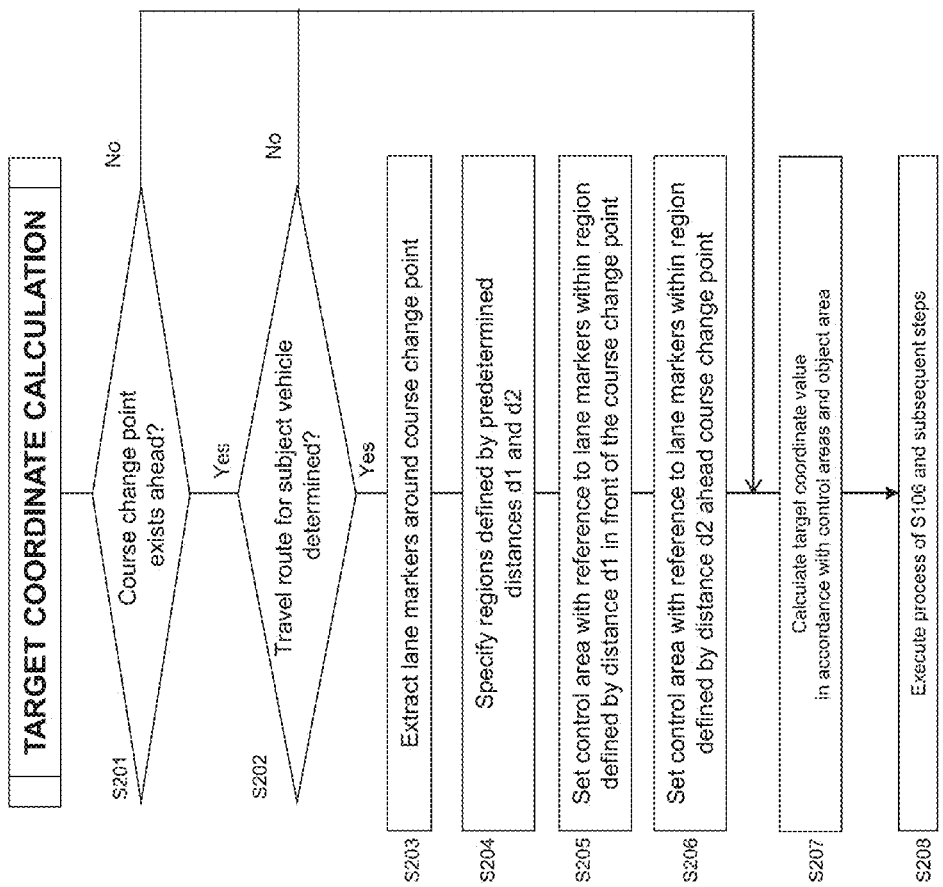
FIG. 10 is a flowchart illustrating a subroutine of step S105 of FIG. 9.

Referring now to the flowchart of FIG. 10, a target coordinate calculation process of step S105 is illustrated. This process will be described below.

First, in step S201, the control device 10 determines whether or not a course change point TP exists ahead the subject vehicle V1. For example, the control device 10 refers to the road information 122 and map information 123 possessed by the navigation device 120 of the onboard apparatus 200 to determine that a course change point TP exists, when acquiring information that a location, such as an intersection at which the subject vehicle V1 may change its course exists within a predetermined distance (e.g. about 30 to 200 meters) ahead the subject vehicle V1. When, in step S201, a determination is made that a course change point TP exists ahead the subject vehicle V1, the routine proceeds to step S202. When, in step S201, a determination is made that a course change point TP does not exist ahead the subject vehicle V1, the routine proceeds to step S207.

In step S202, the control device 10 determines whether or not a travel route of the subject vehicle V1 is set. For example, when the course change direction of the subject vehicle V1 in the vicinity of the course change point TP, which is determined to exist in the above-described step S201, is preliminarily known, such as when a route from the current position of the subject vehicle V1 to a destination has been calculated by the navigation device 120 of the onboard apparatus 200 and when a target route RT has been planned by the control device 10, the control device 10 determines that a travel route of the subject vehicle V1 is set. When, in step S202, a determination is made that a travel route of the subject vehicle V1 is set, the routine proceeds to step S203. When, in step S202, a determination is made that a travel route of the subject vehicle V1 is not set, the routine proceeds to step S207.

In step S203, the control device 10 extracts lane markers in the vicinity of the course change point TP which is determined to exist in the above-described step S201. For example, the control device 10 extracts lane markers that exist in a certain region in the vicinity of the course change point TP, such as represented by the circle in each of FIGS. 3 to 5.

In step S204, the control device 10 specifies, for the lane markers extracted in step S203, regions that are defined by predetermined distances d1 and d2 which are distances from the course change point TP. That is, as described above with reference to FIGS. 3 to 5, the control device 10 sets a predetermined distance d1 from the course change point TP toward the subject vehicle V1 and sets a predetermined distance d2 from the course change point TP toward ahead the subject vehicle V1, thereby specifying the regions defined by the predetermined distances d1 and d2.

In step S205, the control device 10 specifies lane markers that exist within the region defined by the predetermined distance d1 specified in step S204, and sets the control area associated with the specified lane markers to be relatively small, such as illustrated in FIGS. 3 to 5.

In step S206, the control device 10 specifies lane markers that exist within the region defined by the predetermined distance d2 specified in step S204, and sets the control area associated with the specified lane markers to be relatively small, such as illustrated in FIGS. 3 to 5.

Figure 9:
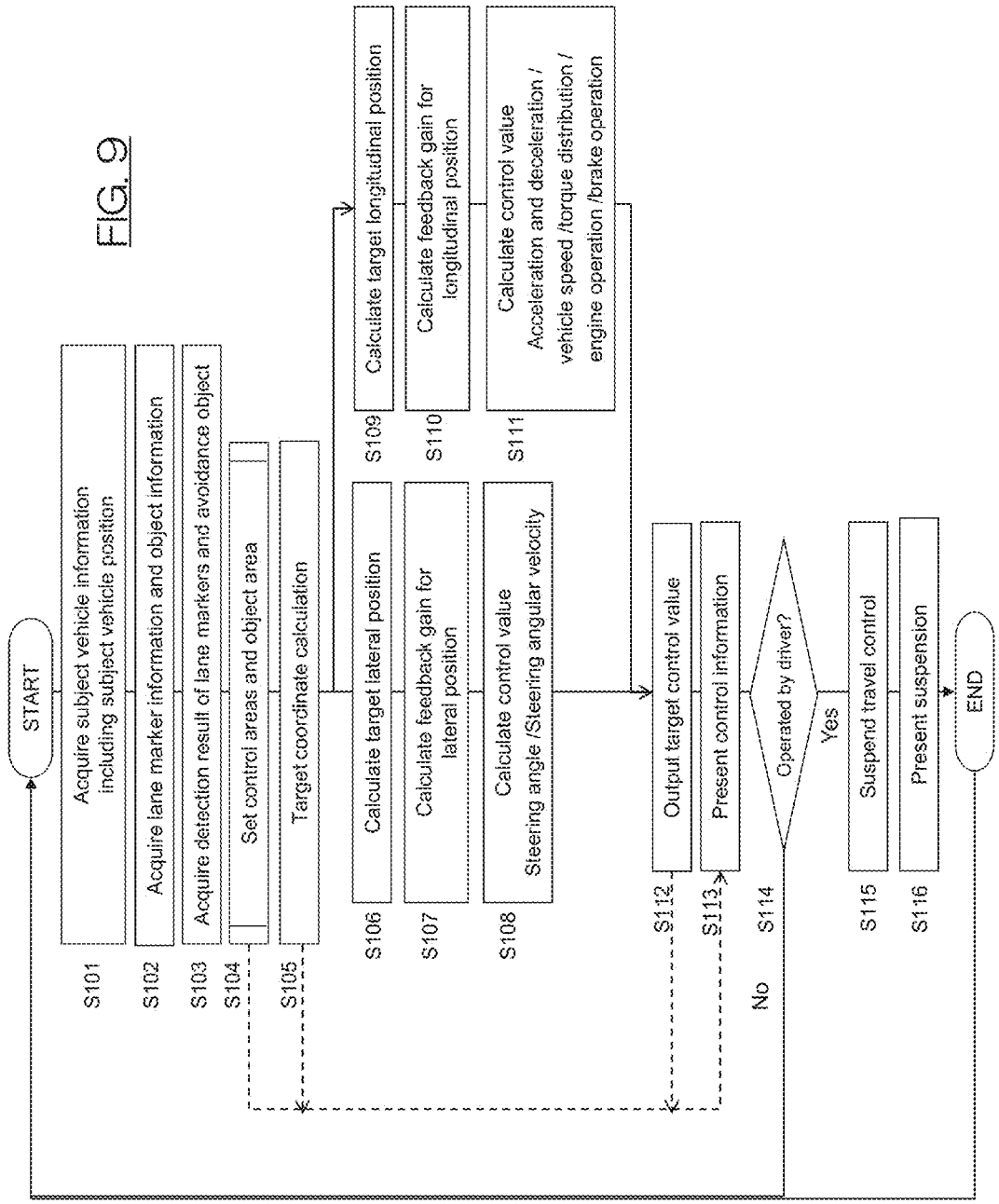
FIG. 9 is a flowchart illustrating a control procedure for controlling travel of the subject vehicle.

In step S207, the control device 10 calculates target coordinates and a target route RT1 for avoiding the object area, on the basis of the control areas and object area set in step S104 of FIG. 9 and the above-described control areas set in steps S205 and S206. Again, the target coordinates and target route RT pass between a pair of lane markers that define a lane in which the subject vehicle V1 travels.

Step S207 also follows the case in which a determination has been made that a course change point TP does not exist ahead the subject vehicle V1 ("No" in step S201) and the case in which a determination has been made that a travel route of the subject vehicle V1 is not set ("No" in step S202), in which cases the control device 10 calculates the target coordinates and target route RT only on the basis of the control areas and object area which are set in step S104 of FIG. 9.

Step S207 is followed by step S208 in which the control device 10 executes the process of step S106 and subsequent steps.

The travel control device 100 according to one or more embodiments of the present invention is configured and operates as the above and therefore has the following effects.

(1) According to the travel control device 100 in one or more embodiments of the present invention, a lane marker is detected which crosses the width direction line including a course change point, and extends by a predetermined distance. The subject vehicle V1 starts course change at the course change point, which is located ahead the subject vehicle V1 in its travel direction. Control areas are set with reference to the detected lane marker. The control areas comprise one at the course change side of the subject vehicle V1 and the other. The ratio (WR/WT) of a width WR of the other to a width WT of the one is set relatively large. Therefore, the target route RT planned based on the control areas is to more deviate toward the course change side in the vicinity of the course change point TP. As a result, when the subject vehicle V1 changes its course at the course change point TP, the travel position of the subject vehicle V1 in the travel lane deviates toward the course change side. This operation matches the passengers' expectation of following the course change motion and can mitigate the uncomfortable feeling given to the passengers of the subject vehicle V1.

(2) According to the travel control device 100 in one or more embodiments of the present invention, the ratio (WR/WT) of the widths of control areas is set relatively large, provided that these control areas are set with reference to a lane marker that exists within a region defined by a predetermined distance d1 from the course change point TP, at which the subject vehicle V1 starts course change, toward the subject vehicle V1. Through this setting, the target route RT is planned to deviate toward the course change side before the subject vehicle V1 changes its course at the course change point TP, and the travel position of the subject vehicle V1 can thus be appropriately deviated toward the course change side before the course change.

(3) According to the travel control device 100 in one or more embodiments of the present invention, the ratio (WR/WT) of the widths of control areas is set relatively large, provided that these control areas are set with reference to a lane marker that exists within a region defined by a predetermined distance d2 from the course change point TP, at which the subject vehicle V1 starts course change, toward ahead the subject vehicle V1. Through this setting, the target route RT is planned to deviate toward the course change side after the subject vehicle V1 changes its course at the course change point TP, and the travel position of the subject vehicle V1 can thus be smoothly recovered to near the center of the lane after the course change.

(4) According to the travel control device 100 in one or more embodiments of the present invention, the width WT of a control area that is set at the course change side of the subject vehicle V1 is set to be the same width at a finish end of the region defined by a predetermined distance d1 and at a start end of the region defined by a predetermined distance d2. This setting allows the target route RT to be planned such that the subject vehicle V1 can smoothly travel in the vicinity of the course change point TP. The travel control for the subject vehicle V1 can thus be more appropriately performed.

(5) According to the travel control device 100 in one or more embodiments of the present invention, in the region of a predetermined distance d1 from the course change point TP, an area is set in which the ratio (WR/WT) of the widths of control areas increases as approaching the course change point TP, and in the region of a predetermined distance d2 from the course change point TP, an area is set in which the ratio (WR/WT) of the widths of control areas decreases as separating from the course change point TP. Through this setting, the target route RT is planned to achieve smooth control in which the subject vehicle V1 is operated to deviate toward the course change side when approaching the course change point TP and the travel position is recovered to near the center of the travel lane when separating from the course change point TP. The travel control for the subject vehicle V1 can thus be more appropriately performed.

(6) According to the travel control device 100 in one or more embodiments of the present invention, when the road on which the subject vehicle V1 is traveling is a straight road (road without a branch), the subject vehicle V1 is operated to travel near the center of the travel lane. Through this operation, the subject vehicle V1 is less likely to unnecessarily deviate rightward or leftward while traveling. This can prevent a situation in which passengers of other vehicles traveling around the subject vehicle V1 misunderstand that the subject vehicle V1 attempts to change its course.

(7) According to the travel control device 100 in one or more embodiments of the present invention, when a travel route is not planned for the subject vehicle V1, the subject vehicle V1 is operated to travel near the center of the travel lane. Through this operation, the subject vehicle V1 is less likely to unnecessarily deviate rightward or leftward while traveling. This can prevent a situation in which passengers of other vehicles traveling around the subject vehicle V1 misunderstand that the subject vehicle V1 attempts to change its course.

(8) According to the travel control device 100 in one or more embodiments of the present invention, when a passenger of the subject vehicle V1 performs a steering operation, the travel control is prohibited. Control can therefore be performed to prioritize the intention of the passenger of the subject vehicle V1.

(9) According to the travel control device 100 in one or more embodiments of the present invention, the higher the speed limit of the road on which the subject vehicle V1 travels is, the longer the predetermined distances d1 and d2 are set. Therefore, an appropriate target route RT is planned in accordance with the traveling speed of the subject vehicle V1 and the travel control for the subject vehicle V1 can be more appropriately performed.

(10) According to the travel control device 100 in one or more embodiments of the present invention, when an avoidance object which the subject vehicle V1 should avoid is detected, the travel position of the subject vehicle V1 is controlled so as to avoid the avoidance object. Therefore, the subject vehicle V1 will avoid the avoidance object in a sophisticated manner and the travel control for the subject vehicle V1 can be more appropriately performed.

(11) According to the travel control device 100 in one or more embodiments of the present invention, when another vehicle is detected which is expected to overtake or pass by the subject vehicle V1 during the course change of the subject vehicle V1, the travel position of the subject vehicle V1 is controlled such that the avoidance amount for avoiding the other vehicle (avoidance amount for the subject vehicle V1 along the width direction of the travel lane) is relatively small. Through this operation, the avoidance amount for the subject vehicle V1 to avoid the other vehicle decreases. Therefore, after the subject vehicle V1 deviates toward the course change side, the subject vehicle V1 is less likely to further deviate toward the course change side in order to avoid the other vehicle. The subject vehicle V1 can thus be prevented from excessively coming close to lane markers.

(12) According to the travel control device 100 in one or more embodiments of the present invention, when an oncoming vehicle is detected which is expected to pass by the subject vehicle V1 in the opposite direction during the course change of the subject vehicle V1, the ratio (WR/WT) of the widths of control areas set with reference to a lane marker in the vicinity of the course change point TP is set smaller than that when such an oncoming vehicle is not detected. Through this setting, the target route RT is planned with a reduced amount of deviating the subject vehicle V1 toward the course change side. As a result, the subject vehicle V1 can be prevented from excessively coming close to the oncoming vehicle.

(13) According to the travel control device 100 in one or more embodiments of the present invention, when the subject vehicle V1 is operated to overtake or pass by an avoidance object during the course change of the subject vehicle V1, the travel position of the subject vehicle V1 is controlled such that the avoidance amount for avoiding the avoidance object (avoidance amount for the subject vehicle V1 along the width direction of the travel lane) is relatively small. The subject vehicle V1 attempts to avoid the avoidance object when changing the course at the course change point TP, but the target route RT is planned such that the travel position is less likely to vary in the opposite direction to the course change side. The subject vehicle V1 can thus be prevented from deviating toward the opposite side to the course change side.

(14) According to the travel control device 100 in one or more embodiments of the present invention, the timing of causing the subject vehicle V1 to avoid an avoidance object is set in accordance with the classification of the avoidance object. Therefore, the target route RT is planned in accordance with the classification of the avoidance object and the travel control for the subject vehicle V1 can be more appropriately performed.

(15) According to the travel control device 100 in one or more embodiments of the present invention, one or more information items among information in accordance with the positions of lane markers and information regarding the travel control for the subject vehicle V1 by the travel control device 100 are output to external, and the passengers of the subject vehicle and/or other vehicles can thereby be preliminarily informed of the behavior of the subject vehicle. This allows the passengers of the subject vehicle and/or other vehicles to respond to the behavior of the subject vehicle.

(16) When the travel control method according to one or more embodiments of the present invention is executed by the control device 10, the same action and effect can be obtained as in the above travel control device 100.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, in the present description, one or more embodiments of the travel control device according to the present invention are described by exemplifying the travel control device 100 which, together with the onboard apparatus 200, constitutes the travel control system 1, but the present invention is not limited to this.

In the present description, the travel control device 100 comprising the control device 10 which executes the subject vehicle information acquisition function, object information acquisition function, lane marker information acquisition function, control area setting function, object area setting function, route planning function and control function is described as one example of a travel control device comprising a first information acquisition unit, second information acquisition unit, setting unit and control unit, but the present invention is not limited to this. In the present description, the travel control device 100 further comprising the output devices 30 and 110 is described as one example of a travel control device further comprising an output unit, but the present invention is not limited to this.

DESCRIPTION OF REFERENCE NUMERALS

1 Travel control system
100 Travel control device
10 Control device
20 Communication device
30 Output device
31 Display
32 Speaker
200 Onboard apparatus
40 Communication device
50 Detection device
60 Sensor
70 Vehicle controller
80 Driving device
90 Steering device
110 Output device
120 Navigation device
R1 to R9 Control area
RV2, RV4, RV5, RV6, RV7 Detection area
TP Course change point
V1 Subject vehicle
V2, V4, V5, V6, V7 Another vehicle (Avoidance object)

The invention claimed is:

1. A travel control device comprising:
a control device configured to:
acquire subject vehicle information including a position of a subject vehicle;
acquire lane marker information including positions of lane markers existing around the subject vehicle;
set a pair of control areas at right and left of the subject vehicle with reference to the lane markers, the control areas each having a predetermined width;
control a travel position of the subject vehicle so that the subject vehicle travels between the pair of control areas, the travel position of the subject vehicle being along a width direction of a travel lane in which the subject vehicle is traveling;
detect a change-point lane marker on a basis of the lane marker information, the change-point lane marker being a lane marker crossing a width direction line including a course change point at which the subject vehicle starts course change and extending by a predetermined distance, the course change point being located ahead of the subject vehicle in a travel direction; and
when the pair of control areas are set with reference to the change-point lane marker that comprises one of the pair at a course change side of the subject vehicle and the other one of the pair, then set a ratio (WR/WT) of a width (WR) of the other one of the pair to a width (WT) of the one of the pair to be larger than the ratio (WR/WT) of the widths of control areas set with reference to a lane marker other than the change-point lane marker, the lane marker other than the change-point lane marker existing within a region from the course change point to a point in front of the subject vehicle.

2. The travel control device according to claim 1, wherein the change-point lane marker includes a first change-point lane marker existing within a predetermined first distance defined from the course change point toward the subject vehicle, and the control device sets the ratio (WR/WT) of the widths of control areas set with reference to the first change-point lane marker to be larger than the ratio (WR/WT) of the widths of control areas set with reference to a lane marker other than the first change-point lane marker,
and the lane marker other than the first change-point lane marker exists within the region from the course change point to the point in front of the subject vehicle.

3. The travel control device according to claim 2, wherein the change-point lane marker includes a second change-point lane marker existing within a predetermined second distance defined from the course change point toward ahead of the subject vehicle, and the control device sets the ratio (WR/WT) of the widths of control areas set with reference to the second change-point lane marker to be larger than the ratio (WR/WT) of the widths of control areas set with reference to the lane marker other than the first change-point lane marker, and
the lane marker other than the first change-point lane marker exists within the region from the course change point to the point in front of the subject vehicle.

4. The travel control device according to claim 3, wherein the control device sets the widths of the control areas to be equal at a finish end of the first change-point lane marker and at a start end of the second change-point lane marker in the travel direction of the subject vehicle.

5. The travel control device according to claim 3,
wherein the control areas set with reference to the first change-point lane marker include areas of which the ratio (WR/WT) of the widths increases as approaching the course change point, and
the control areas set with reference to the second change-point lane marker include areas of which the ratio (WR/WT) of the widths decreases as separating from the course change point.

6. The travel control device according to claim 1,
wherein, while the subject vehicle is traveling on a straight road, the control device controls the travel position of the subject vehicle so as to drive the subject vehicle near the center in the width direction of the travel lane in which the subject vehicle is traveling.

7. The travel control device according to claim 1,
wherein, when a travel route of the subject vehicle is not set, the control device controls the travel position of the subject vehicle so as to drive the subject vehicle near the center in the width direction of the travel lane in which the subject vehicle is traveling.

8. The travel control device according to claim 1,
wherein, when a steering operation by a passenger of the subject vehicle is detected while the subject vehicle is traveling around the change-point lane marker, the control device prohibits control of the travel position of the subject vehicle.

9. The travel control device according to claim 1,
wherein the control device performs detection of the change-point lane marker such that a length of the change-point lane marker along the travel direction of the subject vehicle increases as a speed limit increases on a road on which the subject vehicle is traveling.

10. The travel control device according to claim 1,
wherein, when an avoidance object which the subject vehicle should avoid is detected, the control device controls the travel position of the subject vehicle so as to operate the subject vehicle to avoid the avoidance object in priority to control for traveling between the pair of control areas.

11. The travel control device according to claim 10,
wherein, when a following vehicle that is expected to overtake or pass by the subject vehicle is detected as the avoidance object, the control device controls the travel position of the subject vehicle so that a control amount for the travel position in the width direction when the subject vehicle is operated to avoid the avoidance object near the change-point lane marker is smaller than that when the subject vehicle is operated to avoid the avoidance object near a lane marker other than the change-point lane marker.

12. The travel control device according to claim 10,
wherein, when an oncoming vehicle that is expected to pass by the subject vehicle is detected as the avoidance object before the subject vehicle passes the course change point, the control device sets the ratio (WR/WT) of the widths of control areas set with reference to the change-point lane marker to be smaller than that when the oncoming vehicle is not detected.

13. The travel control device according to claim 10,
wherein, when control is performed such that the subject vehicle is operated to avoid the avoidance object by overtaking or passing by the avoidance object, the control device controls the travel position of the subject vehicle so that a control amount for the travel position in the width direction when the subject vehicle is operated to avoid the avoidance object near the change-point lane marker is smaller than that when the subject vehicle is operated to avoid the avoidance object near a lane marker other than the change point lane marker.

14. The travel control device according to claim 10,
wherein the control device sets timing of causing the subject vehicle to avoid the avoidance object in accordance with a classification of the avoidance object.

15. The travel control device according to claim 1, further comprising:
an output device configured to output, to external, one or more information items among information in accordance with the lane marker information, information in accordance with locations of the control areas, and information in accordance with control of the travel position of the subject vehicle.

16. A travel control method for a vehicle executed by a computer, the computer controlling a subject vehicle so that the subject vehicle travels between lane markers at right and left of the subject vehicle, the travel control method comprising:
acquiring subject vehicle information including a position of the subject vehicle;
acquiring lane marker information including positions of lane markers existing around the subject vehicle;
setting control areas with reference to the lane markers, the control areas each having a predetermined width; and
controlling a travel position of the subject vehicle so that the subject vehicle travels between a pair of control areas set at right and left of the subject vehicle, the travel position of the subject vehicle being along a width direction of a travel lane in which the subject vehicle is traveling,
the setting control areas with reference to the lane markers including, when the pair of control areas are set with reference to a change-point lane marker that comprises one of the pair at a course change side of the subject vehicle and the other one of the pair, then setting a ratio (WR/WT) of a width (WR) of the other of the pair to a width (WT) of the one of the pair to be larger than the ratio (WR/WT) of the widths of control areas set with reference to a lane marker other than the change-point lane marker, the change-point lane marker being a lane marker course change and extending by a predetermined distance, the course change point being located ahead of the subject vehicle in a travel direction, the lane marker other than the change-point lane marker existing within a region from the course change point to a point in front of the subject vehicle.

* * * * *